(12) United States Patent
Mesher

(10) Patent No.: US 9,849,895 B2
(45) Date of Patent: Dec. 26, 2017

(54) SENSOR SYNCHRONIZATION APPARATUS AND METHOD

(71) Applicant: Tetra Tech, Inc., Pasadena, CA (US)

(72) Inventor: Darel Mesher, Spruce Grove (CA)

(73) Assignee: TETRA TECH, INC., Pasadena, CA (US)

( * ) Notice: Subject to any disclaimer, the term of this patent is extended or adjusted under 35 U.S.C. 154(b) by 0 days.

(21) Appl. No.: 14/724,890

(22) Filed: May 29, 2015

(65) Prior Publication Data

US 2016/0207551 A1    Jul. 21, 2016

Related U.S. Application Data

(60) Provisional application No. 62/104,886, filed on Jan. 19, 2015, provisional application No. 62/118,600, filed on Feb. 20, 2015.

(51) Int. Cl.
| | |
|---|---|
| *G01J 3/30* | (2006.01) |
| *B61L 23/04* | (2006.01) |
| *G01B 21/04* | (2006.01) |
| *G01B 11/245* | (2006.01) |
| *G01B 11/25* | (2006.01) |

(52) U.S. Cl.
CPC ............. *B61L 23/04* (2013.01); *B61L 23/044* (2013.01); *B61L 23/045* (2013.01); *B61L 23/047* (2013.01); *G01B 11/245* (2013.01); *G01B 11/25* (2013.01); *G01B 21/04* (2013.01)

(58) Field of Classification Search
CPC .. G06F 19/00; B60Q 1/00; H04N 7/18; B61K 9/08; B61K 9/00; B61L 23/045; B61L 23/044; B61L 2205/04; B61L 23/04; B61L 23/047; G01B 11/245; G01B 11/25; G01B 21/04
See application file for complete search history.

(56) References Cited

U.S. PATENT DOCUMENTS

| | | |
|---|---|---|
| 3,562,419 A | 2/1971 | Stewart et al. |
| 3,942,000 A | 3/1976 | Dieringer |
| 4,040,738 A | 8/1977 | Wagner |
| 4,198,164 A | 4/1980 | Cantor |
| 4,265,545 A | 5/1981 | Slaker |
| 4,490,038 A | 12/1984 | Theurer et al. |
| 4,531,837 A | 7/1985 | Panetti |
| 4,554,624 A | 11/1985 | Wickham et al. |
| 4,653,316 A | 3/1987 | Fukuhara |

(Continued)

FOREIGN PATENT DOCUMENTS

| | | |
|---|---|---|
| CA | 2732971 | 1/2016 |
| CA | 2860073 | 5/2016 |

(Continued)

OTHER PUBLICATIONS

Russia Patent and Trademark Office, Decision on Grant for Application No. 2007103331 dated Oct. 22, 2009.

(Continued)

*Primary Examiner* — Jamil Ahmed
(74) *Attorney, Agent, or Firm* — Robinson IP Law, PLLC

(57) ABSTRACT

A system and method for inspecting a railway track bed using a plurality of sensors that are synchronized for rapid interrogation of a railway track bed while the sensors are in motion at a high rate of speed.

15 Claims, 19 Drawing Sheets

(56) References Cited

U.S. PATENT DOCUMENTS

| | | | |
|---|---|---|---|
| 4,700,223 A | 10/1987 | Shoutaro et al. | |
| 4,775,238 A | 10/1988 | Weber | |
| 4,900,153 A | 2/1990 | Weber et al. | |
| 4,915,504 A | 4/1990 | Thurston | |
| 4,974,168 A | 11/1990 | Marx | |
| 5,199,176 A | 4/1993 | Theurer et al. | |
| 5,245,855 A | 9/1993 | Burgel et al. | |
| 5,487,341 A | 1/1996 | Newman | |
| 5,493,499 A | 2/1996 | Theurer et al. | |
| 5,671,679 A | 9/1997 | Straub et al. | |
| 5,721,685 A | 2/1998 | Holland et al. | |
| 5,757,472 A | 5/1998 | Wangler et al. | |
| 5,791,063 A | 8/1998 | Kesler et al. | |
| 5,793,491 A | 8/1998 | Wangler et al. | |
| 5,808,906 A | 9/1998 | Sanchez-Revuelta et al. | |
| 5,970,438 A | 10/1999 | Clark et al. | |
| 6,025,920 A | 2/2000 | Dec | |
| 6,064,428 A | 5/2000 | Trosino et al. | |
| 6,128,558 A | 10/2000 | Kernwein | |
| 6,243,657 B1 | 6/2001 | Tuck et al. | |
| 6,347,265 B1 | 2/2002 | Bidaud | |
| 6,356,299 B1 | 3/2002 | Trosino et al. | |
| 6,405,141 B1 | 6/2002 | Carr et al. | |
| 6,600,999 B2 | 7/2003 | Clark et al. | |
| 6,615,648 B1 | 9/2003 | Ferguson et al. | |
| 6,647,891 B2 | 11/2003 | Holmes et al. | |
| 6,768,959 B2 | 7/2004 | Ignagni | |
| 6,804,621 B1 | 10/2004 | Pedanckar | |
| 7,023,539 B2 | 4/2006 | Kowalski | |
| 7,036,232 B2 | 5/2006 | Casagrande | |
| 7,054,762 B2 | 5/2006 | Pagano et al. | |
| 7,130,753 B2 | 10/2006 | Pedanekar | |
| 7,164,476 B2 | 1/2007 | Shima et al. | |
| 7,616,329 B2 | 11/2009 | Villar et al. | |
| 7,680,631 B2 | 3/2010 | Selig et al. | |
| 7,755,660 B2 | 7/2010 | Nejikovsky et al. | |
| 8,081,320 B2 | 12/2011 | Villar et al. | |
| 8,190,377 B2 | 5/2012 | Fu | |
| 8,209,145 B2 | 6/2012 | Paglinco et al. | |
| 8,405,837 B2 | 3/2013 | Nagle, II et al. | |
| 8,412,393 B2 | 4/2013 | Anderson | |
| 8,724,904 B2 | 5/2014 | Fujiki | |
| 8,934,007 B2 | 1/2015 | Snead | |
| 8,958,079 B2 | 2/2015 | Kainer et al. | |
| 9,049,433 B1* | 6/2015 | Prince | G06T 7/001 |
| 9,175,998 B2 | 11/2015 | Turner et al. | |
| 9,187,104 B2 | 11/2015 | Fang et al. | |
| 9,234,786 B2 | 1/2016 | Groll et al. | |
| 9,297,787 B2 | 3/2016 | Fisk | |
| 9,310,340 B2 | 4/2016 | Mian et al. | |
| 9,336,683 B2 | 5/2016 | Inomata et al. | |
| 9,346,476 B2 | 5/2016 | Dargy et al. | |
| 9,389,205 B2 | 7/2016 | Mian et al. | |
| 9,423,415 B2 | 8/2016 | Nanba et al. | |
| 9,429,545 B2 | 8/2016 | Havira et al. | |
| 9,441,956 B2 | 9/2016 | Kainer et al. | |
| 2001/0045495 A1 | 11/2001 | Olson et al. | |
| 2002/0070283 A1 | 6/2002 | Young | |
| 2002/0099507 A1 | 7/2002 | Clark et al. | |
| 2002/0122113 A1* | 9/2002 | Foote | G06T 3/4038 348/48 |
| 2002/0150278 A1 | 10/2002 | Wustefeld | |
| 2002/0196456 A1 | 12/2002 | Komiya et al. | |
| 2003/0059087 A1 | 3/2003 | Waslowski et al. | |
| 2003/0075675 A1 | 4/2003 | Braune et al. | |
| 2003/0140509 A1 | 7/2003 | Casagrande | |
| 2003/0164053 A1 | 9/2003 | Ignagni | |
| 2004/0021858 A1 | 2/2004 | Shima et al. | |
| 2004/0088891 A1 | 5/2004 | Theurer | |
| 2004/0122569 A1 | 6/2004 | Bidaud | |
| 2004/0189452 A1* | 9/2004 | Li | G01S 15/931 340/435 |
| 2004/0263624 A1* | 12/2004 | Nejikovsky | B61K 9/08 348/148 |
| 2005/0279240 A1 | 12/2005 | Pedanekar et al. | |
| 2006/0017911 A1 | 1/2006 | Villar | |
| 2006/0098843 A1 | 5/2006 | Chew | |
| 2006/0171704 A1 | 8/2006 | Bingle | |
| 2007/0136029 A1 | 6/2007 | Selig et al. | |
| 2007/0150130 A1 | 6/2007 | Welles | |
| 2008/0298674 A1* | 12/2008 | Baker | G06K 9/209 382/154 |
| 2008/0304065 A1 | 12/2008 | Hesser | |
| 2008/0304083 A1 | 12/2008 | Farritor et al. | |
| 2009/0273788 A1 | 11/2009 | Nagle et al. | |
| 2009/0319197 A1* | 12/2009 | Villar | B61K 9/08 702/34 |
| 2010/0289891 A1* | 11/2010 | Akiyama | G01B 11/245 348/126 |
| 2012/0026352 A1 | 2/2012 | Natroshvilli et al. | |
| 2014/0151512 A1 | 6/2014 | Cooper | |
| 2015/0219487 A1 | 8/2015 | Maraini | |
| 2016/0002865 A1 | 1/2016 | English et al. | |
| 2016/0121912 A1 | 5/2016 | Puttagunta et al. | |
| 2016/0304104 A1 | 10/2016 | Witte et al. | |
| 2016/0305915 A1 | 10/2016 | Witte et al. | |
| 2016/0312412 A1 | 10/2016 | Schrunk, III | |

FOREIGN PATENT DOCUMENTS

| | | |
|---|---|---|
| DE | 10040139 A1 | 7/2002 |
| DE | 60015268 | 3/2005 |
| DE | 102012207427 A1 | 7/2013 |
| EP | 1079322 | 2/2001 |
| EP | 1146353 | 10/2001 |
| EP | 1158460 | 11/2001 |
| EP | 1168269 | 1/2002 |
| EP | 1992167 | 5/2016 |
| EP | 3024123 | 5/2016 |
| EP | 2806065 | 9/2016 |
| FR | 2674809 A1 | 10/1992 |
| GB | 2265779 | 10/1993 |
| GB | 2536746 | 9/2016 |
| JP | 60039555 | 3/1985 |
| JP | 6011316 | 1/1994 |
| JP | 06322707 | 11/1994 |
| JP | H07146131 | 6/1995 |
| JP | H07294443 | 11/1995 |
| JP | H07294444 | 11/1995 |
| JP | H0924828 | 1/1997 |
| JP | 10332324 | 12/1998 |
| JP | 11172606 | 6/1999 |
| JP | 2000221146 | 8/2000 |
| JP | 2000241360 | 9/2000 |
| JP | 2002294610 | 10/2002 |
| JP | 2003074004 | 3/2003 |
| JP | 2003121556 | 4/2003 |
| JP | 2004132881 | 4/2004 |
| JP | 2007240342 | 9/2007 |
| JP | 4008082 | 11/2007 |
| JP | 5283548 | 9/2013 |
| JP | 5812595 | 11/2015 |
| JP | 2015209205 | 11/2015 |
| KR | 101562635 | 10/2015 |
| RU | 2142892 | 12/1999 |
| SU | 101851 | 8/1988 |
| SU | 1418105 | 8/1988 |
| WO | 2005098352 | 10/2005 |
| WO | 2006008292 | 1/2006 |
| WO | WO2011002534 | 1/2011 |
| WO | 2013146502 | 3/2013 |
| WO | 2016168576 | 10/2016 |
| WO | 2016168623 | 10/2016 |

OTHER PUBLICATIONS

International Searching Authority; International Search Report and Written Opinion for Application No. PCT/US2010/029076 dated May 24, 2010.

International Searching Authority; International Search Report and Written Opinion for Application No. PCT/US2010/023991 dated Apr. 19, 2010.

(56) References Cited

OTHER PUBLICATIONS

US Patent and Trademark Office, Office Action, U.S. Appl. No. 12/465,473, dated Oct. 5, 2011.
European Patent Office, Supplementary European Search Report issued in EP 05767776.7 dated May 2, 2011.
US Patent and Trademark Office, Office Action for U.S. Appl. No. 13/795,841 dated Sep. 17, 2014.
US Patent and Trademark Office, Final Office Action for U.S. Appl. No. 12/465,473 dated Jul. 31, 2012.
US Patent and Trademark Office, Office Action for U.S. Appl. No. 11/172,618 dated Mar. 23, 2007.
US Patent and Trademark Office, Final Office Action for U.S. Appl. No. 11/172,618 dated Oct. 5, 2007.
US Patent and Trademark Office, Office Action for U.S. Appl. No. 11/172,618 dated Aug. 5, 2008.
US Patent and Trademark Office, Final Office Action for U.S. Appl. No. 11/172,618 dated Apr. 15, 2009.
Kantor, et al., "Automatic Railway Classification Using Surface and Subsurface Measurements" Proceedings of the 3rd International Conference on Field and Service Robitics, pp. 43-48 (2001).
Magnes, Daniel L., "Non-Contact Technology for Track Speed Rail Measurements (ORIAN)" SPIE vol. 2458, pp. 45-51 (1995).
Ryabichenko, et al. "CCD Photonic System for Rail Width Measurement" SPIE vol. 3901, pp. 37-44 (1999).
United States District Court for the Eastern District of Texas Tyler Division, *Georgetown Rail Equipment Company* v. *Holland L.P.*, Defendant's Invalidity Contentions Concerning U.S. Pat. No. 7,616,329 dated Sep. 19, 2013.
United States District Court for the Eastern District of Texas Tyler Division, *Georgetown Rai Equipment Company* v. *Holland L.P.*, Defendant's Supplemental Invalidity Contentions Concerning U.S. Pat. No. 7,616,329 dated Nov. 15, 2013.
Martens, John Ph.D., P.E., CFEI, M.B.A., Electrical Engineering & Computer Science, Initial Report Regarding U.S. Pat. No. 7,616,329 dated Jul. 18, 2014.
Shawn Landers et al., "Development and Calibration of a Pavement Surface Performance Measure and Prediction Models for the British Columbia Pavement Management System" (2002).
Zheng Wu, "Hybrid Multi-Objective Optimization Models for Managing Pavement Assetts" (Jan. 25, 2008).
"Pavement Condition Index 101", OGRA's Milestones (Dec. 2009).
"Rail Radar Bringing the Track Into the Office" presentation given to CN Rail Engineering on Jan. 21, 2011.
Rail Radar, Inc. Industrial Research Assistance Program Application (IRAP) (Aug. 10, 2012).
"Rail Radar Automated Track Assessment" paper distributed at the Association of American Railways (AAR) Transportation Test Center in Oct. 2010 by Rail Radar, Inc.
US Patent and Trademark Office, Office Action for U.S. Appl. No. 14/724,925 dated Feb. 26, 2016.

\* cited by examiner

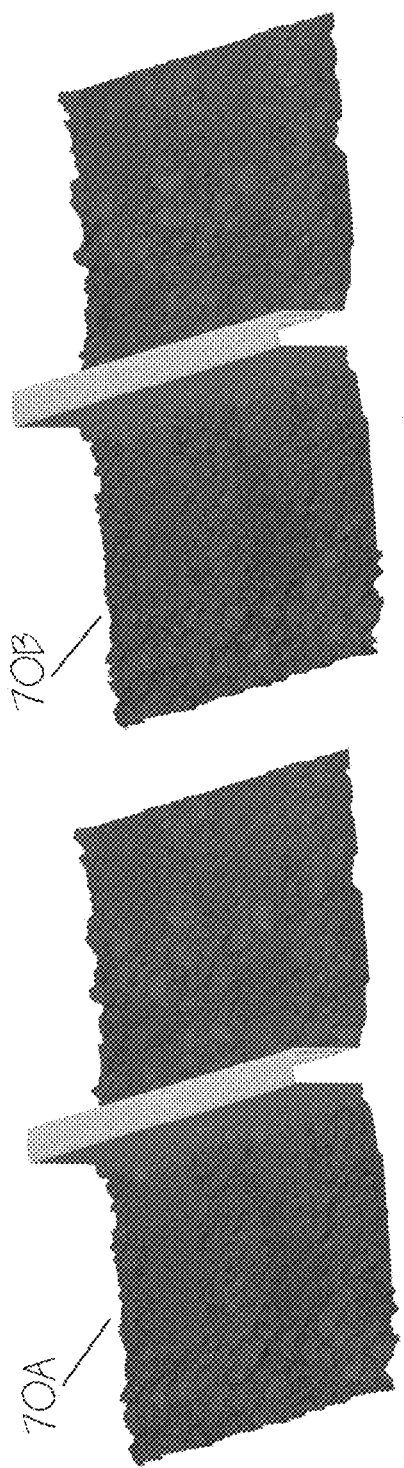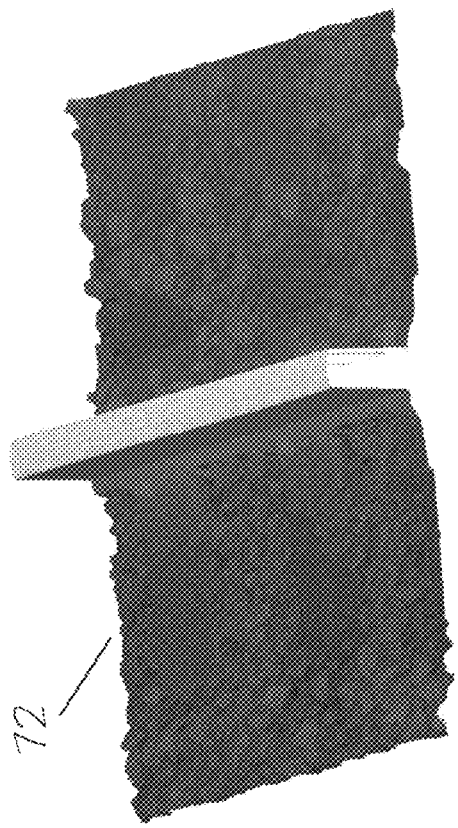

SENSOR SYNCHRONIZATION APPARATUS AND METHOD

CROSS-REFERENCE(S) TO RELATED APPLICATION(S)

This application is a nonprovisional application claiming priority to U.S. Provisional Patent Application Ser. No. 62/104,886 entitled "Sensor Synchronization Apparatus and Method" which was filed on Jan. 19, 2015, the entirety of which is incorporated herein by reference, and further claiming priority to U.S. Provisional Patent Application Ser. No. 62/118,600 entitled "3D Track Assessment System Post-Processing, Analysis and Reporting System" which was filed on Feb. 20, 2015, the entirety of which is incorporated herein by reference.

FIELD

This disclosure relates to the field of railway track inspection and assessment systems.

BACKGROUND

Rail infrastructure owners are motivated to replace the time consuming and subjective process of manual crosstie (track) inspection with objective and automated processes. The intent is to improve rail safety in a climate of increasing annual rail traffic volumes and increasing regulatory reporting requirements. Objective, repeatable, and accurate track inventory and condition assessment also provide owners with the innovative capability of implementing comprehensive asset management systems which include owner/region/environment specific track component deterioration models. Such rail specific asset management systems would yield significant economic benefits in the operation, maintenance and capital planning of rail networks.

A primary goal of such automated systems is the non-destructive high-speed assessment of railway track infrastructure. Track inspection and assessment systems currently exist including, for example, Georgetown Rail (GREX) Aurora 3D surface profile system and Ensco Rail 2D video automated track inspection systems. Such systems typically use coherent light emitting technology, such as laser radiation, to illuminate regions of the railway track bed during assessment operations.

An important factor limiting the speed at which railway inspections and assessments can be accomplished is the performance of the measurement hardware being used to scan the railway. For example, SICK IVP Industrial Sensors of Sweden produces one of the highest speed three dimensional sensors available, capable of producing railway track measurements every 6 millimeters at 100 kilometers per hour (4600 profiles per second). Although the nominal longitudinal sample spacing resolution using a single sensor is acceptable, higher performance systems would be beneficial, increasing analysis capabilities and resulting in improved condition assessments.

What is needed, therefore, is a means to increase the survey speed of shorter longitudinal sample interval railway track inspections and assessments using sensors with limited measurement speed performance.

SUMMARY

A system for inspecting railway track infrastructure at high speed and high resolution is disclosed wherein the system includes a power source (e.g., a gas powered engine providing electrical power, a generator or a battery); a light emitting apparatus powered by the power source for emitting light energy toward a railway track; and a data storage apparatus. The system further includes a first sensor for sensing reflected light that was emitted from the light emitting apparatus and acquiring three dimensional image data of the railway track to be stored in the data storage apparatus. The image data is preferably elevation (or range) and intensity data gathered using a 3D sensor. The system further includes a second sensor for sensing reflected light that was emitted from the light emitting apparatus and acquiring three dimensional image data of the railway track to be stored in the data storage apparatus. The system also includes at least one processor in communication with the data storage apparatus, the first sensor and the second sensor, the processor for sequencing the timing of operation for the first sensor and the second sensor in a cascading, repeating manner such that the first sensor is triggered for operation while the second sensor is on standby and wherein the second sensor is triggered for operation while the first sensor is on standby, and wherein data gathered by the first sensor and the second sensor are combined to generate a higher resolution resultant three dimensional image data of the railway track than if only a single sensor were used.

In one example the longitudinal resolution of the system includes a fixed distance interval between samples ranging from about 2 millimeters to about 3 millimeters when the system travels longitudinally at a speed ranging from about 70 kilometers per hour to about 110 kilometers per hour wherein the first sensor and the second sensor are each configured to take a maximum of from about 4500 samples per second to about 5500 samples per second.

In a related example, a system for inspecting railway track infrastructure at high speed and high resolution is disclosed wherein the system includes a power source; a light emitting apparatus powered by the power source for emitting light energy toward a railway track; and a data storage apparatus. The system further includes a first sensor for sensing reflected light that was emitted from the light emitting apparatus and acquiring three dimensional image data of the railway track to be stored in the data storage apparatus; and a second sensor for sensing reflected light that was emitted from the light emitting apparatus and acquiring three dimensional image data of the railway track to be stored in the data storage apparatus. The system further includes an N sensor, wherein N is a set of one or more ordinal numbers each of which equals a different integer of 3 or greater, for sensing reflected light that was emitted from the light emitting apparatus and acquiring three dimensional image data of the railway track to be stored in the data storage apparatus. For example, N may equal "third" ($3^{rd}$). In a related example, N may equal "third" ($3^{rd}$) and "fourth" ($4^{th}$). In yet another example, N may equal "third", "fourth" and "fifth" ($5^{th}$). The system further includes at least one processor for sequencing the timing of operation for the first sensor, the second sensor, and the $N^{th}$ sensor in a cascading, repeating manner such that the first sensor is triggered for operation while the second sensor and the $N^{th}$ sensor are on standby, wherein the second sensor is triggered for operation while the first sensor and the $N^{th}$ sensor are on standby, and wherein the $N^{th}$ sensor is triggered for operation while the first sensor and the second sensor are on standby, thereby providing higher resolution resultant three dimensional image data of the railway track.

If N equals "third" and "fourth", the third sensor is activated while the first, second and fourth sensors are on standby, and the fourth sensor is activated while the first, second and third sensors are on standby. If N equals "third", "fourth" and "fifth", the fifth sensor is activated while the first, second, third and fourth sensors are on standby and the fifth sensor is on standby whenever the first, second, third or fourth sensors are activated.

In addition to the system disclosed herein, a method is disclosed of inspecting railway track infrastructure at high speed and high resolution. The method includes the steps of emitting a light source toward a railway track bed; sequencing the timing for activation of a first sensor and a second sensor in a repeating pattern so that the first sensor is activated during a time period when the second sensor is on standby and the first sensor is on standby during a time period when the second sensor is activated; detecting light reflected from the railway track bed using the first sensor while the first sensor is activated; and detecting light reflected from the railway track bed using the second sensor while the second sensor is activated.

In one example, the sequencing step further comprises using a processor to trigger sensors and multiplex data based on the number of sensors used to detect light reflected from the railway track bed.

In another example, the method further includes the steps of compiling a data set of first elevation data based on the light detected by the first sensor; and compiling a data set of second elevation data based on the light detected by the second sensor. The method preferably further includes storing the first elevation data on a data storage apparatus and storing the second elevation data on a data storage apparatus. The method preferably further includes the step of combining the first elevation data and the second elevation data to compile a total elevation data set. In on embodiment, the total elevation set has a longitudinal resolution ranging from about 0.002 meters between samples to about 0.004 meters between samples while the first sensor and the second sensor are traveling at a speed ranging from about 70 kilometers per hour to about 110 kilometers per hour. The method preferably further includes the step of analyzing the total elevation data set to inventory components of the railway track infrastructure and to assess the condition of the railway track infrastructure.

In a different example, the sequencing step further comprises using a multiplexed trigger processor and an encoder to generate different timing phases to trigger the activation of a first sensor based on the first phase and triggering the activation of a second sensor based on the second phase trigger signal from the processor.

In another example, the sequencing step further includes sequencing the timing for activation of a third sensor so that the third sensor is activated during a time period when the first sensor and the second sensor are on standby; and detecting light reflected from the railway track bed using the third sensor while the third sensor is activated. The method may further include the step of a data set of third elevation data based on light detected by the third sensor. A further step may include combining the first elevation data, the second elevation data and the third elevation data to compile a total elevation data set. In one embodiment, the total elevation data set may have a longitudinal resolution ranging from about 0.001 meters between samples to about 0.003 meters between samples while the first sensor, the second sensor and the third sensor are traveling at a speed ranging from about 70 kilometers per hour to about 110 kilometers per hour. The sequencing step may further include the step of triggering the activation of the third sensor based on a third phase signal from the multiplexed trigger processor.

In yet another example, the method further includes the steps of storing the first sensor elevation and intensity data on a data storage apparatus; and storing the second sensor elevation and intensity data on the data storage apparatus.

In a different example, the method further includes the step of combining the first elevation and intensity data and the second elevation and intensity data to generate total elevation and intensity data. The method may further include the step of analyzing the total data sets to assess the condition of the railway track.

The summary provided herein is intended to provide examples of particular disclosed embodiments and is not intended to limit the scope of the invention disclosure in any way.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 5A shows a visual representation of data from a first sensor in a two sensor system.

FIG. 5B shows a visual representation of data from a second sensor in a two sensor system.

FIG. 5C shows a visual representation of data combined from the image of FIG. 5A and the image of FIG. 5B.

The figures are provided to illustrate concepts of the invention disclosure and are not intended to limit the scope of the invention disclosure to the exact embodiments provided in the figures.

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

"Track", "Railway track" or "track bed" is defined herein to mean a section of railway including the rails, ties, components holding the rails to the ties, and ballast material.

"Sample" or "profile" is defined herein to include a discrete measurement of reflected light during a specifically defined time period.

A "processor" is defined herein to include a processing unit including, for example, one or more microprocessors, an application-specific instruction-set processor, a network processor, a vector processor, a scalar processor, or any combination thereof, or any other control logic apparatus now known or later developed that is capable of performing the tasks described herein, or any combination thereof.

The phrase "in communication with" means that two or more devices are in communication with one another physically (e.g., by wire) or indirectly (e.g., by wireless communication).

Figure 1:
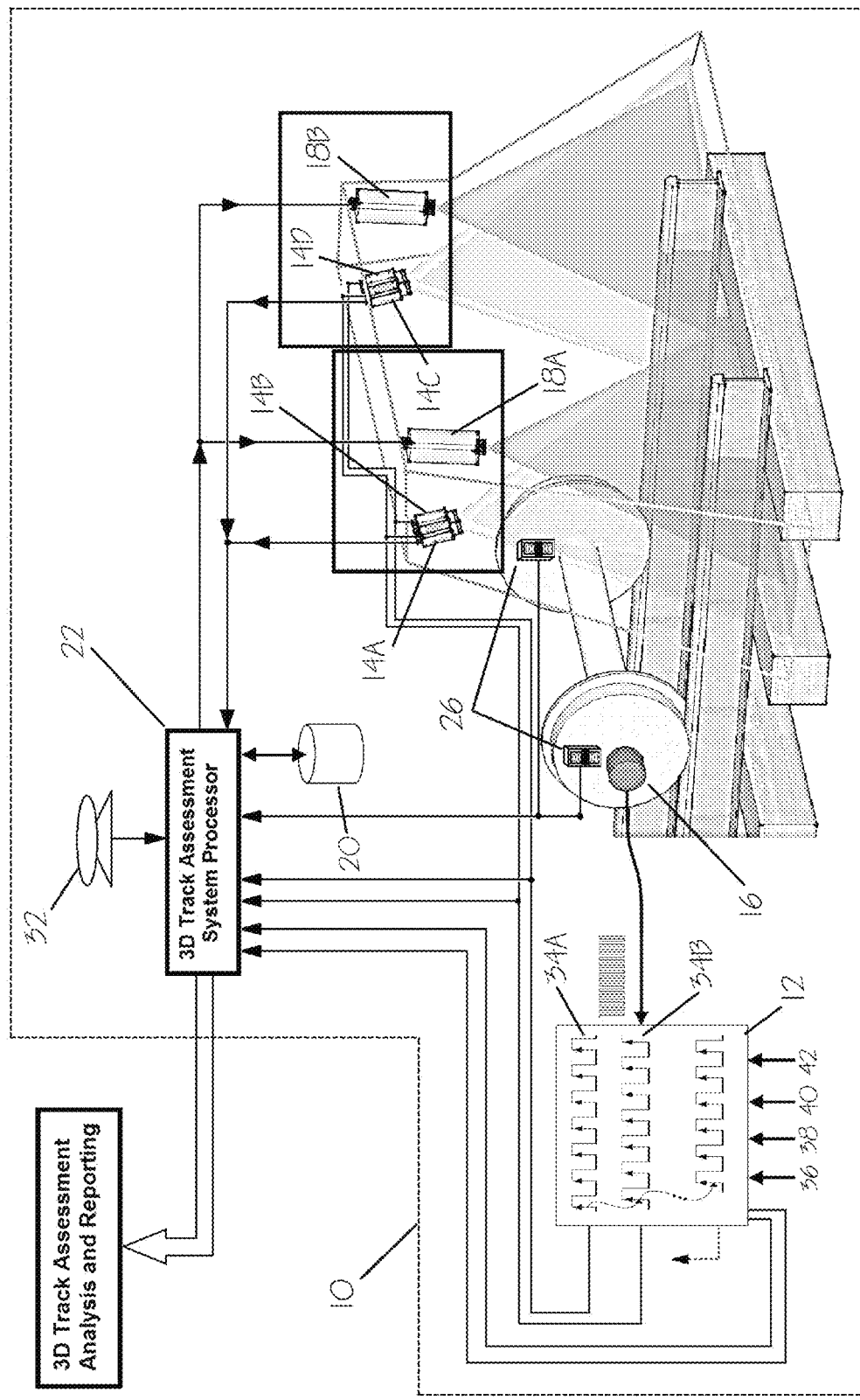
FIG. 1 shows a schematic diagram of a railway track infrastructure inspection and assessment system.

The collection of track surface elevation data for use in railway track bed inventory and condition assessment is possible using a comprehensive track measurement system 10 including a variety of sensors, processors and data storage devices as shown in FIG. 1. The ability to collect high longitudinal resolution (small longitudinal measurement interval) track surface elevation models is achieved using an innovative 3D sensor multiplexed trigger and synchronization system 12 and a plurality of readily available commercial-off-the-shelf 3D sensors 14 (including a first sensor 14A and a second sensor 14B) to collect and store 3D track elevation data at any fixed longitudinal measurement interval at any survey speed. This triggering system uses a high resolution distance measuring encoder 16, that preferably operates with a sufficient number of pulses per wheel revolution to produce a longitudinal sample pulse distance of approximately 0.25 mm per pulse. A first light line projector 18A (e.g. a laser) projects light on a railway track bed and some of the light is reflected off of the track bed and detected by the 3D sensors 14. The data from the 3D sensors 14 is preferably stored on one or more high speed data storage apparatus 20.

The 3D track measurement system 10 preferably includes a 3D track assessment system processor 22 and a trigger and synchronization processor 24. The high resolution distance measuring encoder 16, the plurality of 3D sensors 14 and preferably a plurality of axle accelerometers 26 are in communication with and controlled by the assessment system processor 22. The assessment system processor 22 is in communication with the high speed data storage apparatus 20 and is configured to direct data from the 3D sensors 14 to the high speed data storage apparatus 20.

Figure 2:
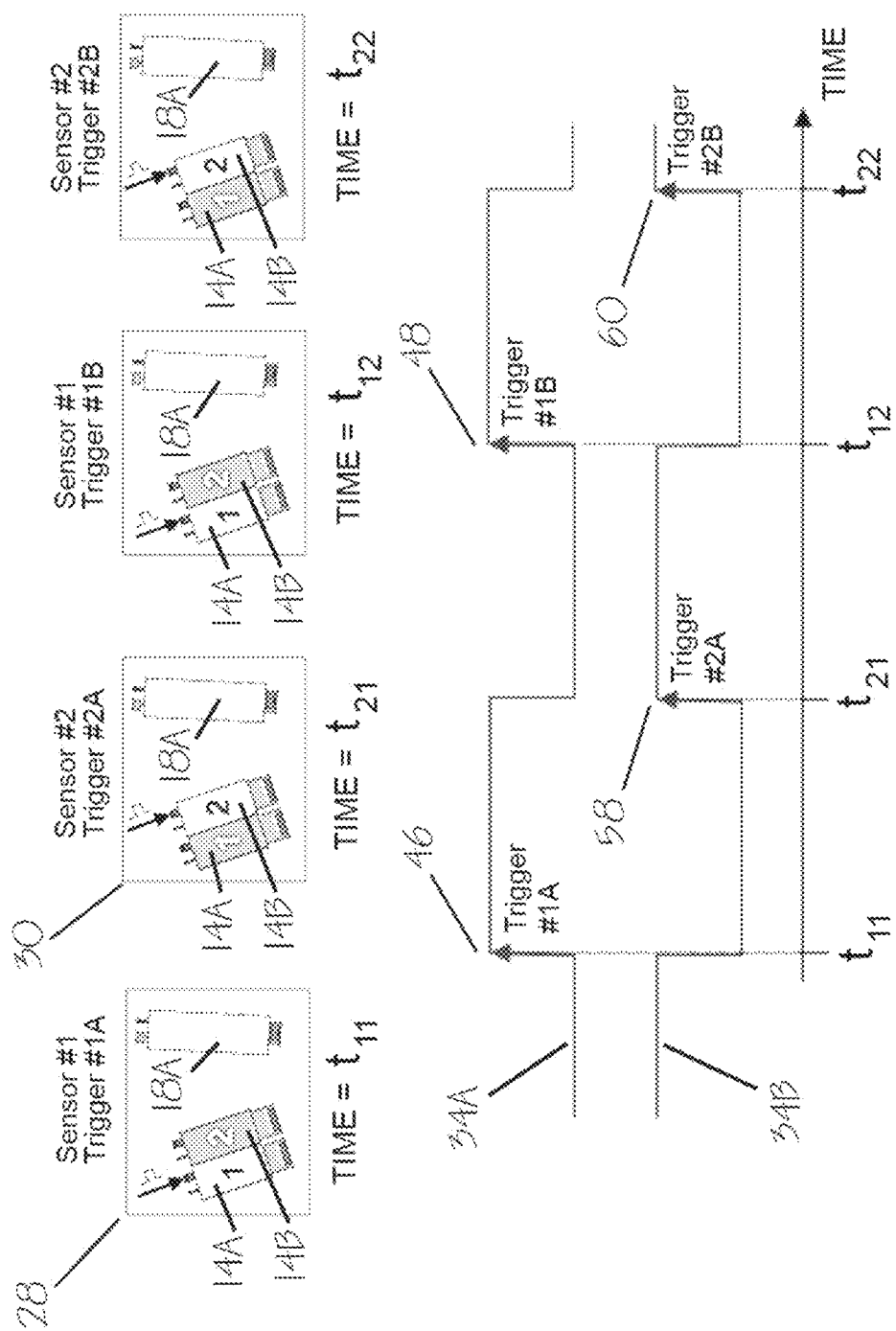
FIG. 2 shows a graphical representation of the multiplexed trigger and sensor activation sequencing for a two sensor system configuration.

Intensity and elevation data is gathered by the 3D sensors 14 and such data is stored in the high speed storage apparatus 20. The resolution of the system 10 is improved using a plurality of sensors 14 triggered in a cascading fashion to produce a combined data collection rate which exceeds the data collection rate of any single sensor. The data gathered by the group of sensors 14 is ultimately interlaced and stored together, thereby creating a data set having a smaller longitudinal interval between samples (resulting in higher resolution 3D data) than if a single 3D sensor was used. If two sensors are used, for example, the first sensor 14A is activated while the second sensor 14B is on standby as shown in block 28 and the second sensor 14B is activated while the first sensor 14A is on standby as shown in block 30 of FIG. 2. What is meant by "on standby" is broadly defined as not actively gathering data but could include activities such as compiling and transmitting data. Any number of sensors may be sequentially triggered thereby increasing the system resolution as shown for example in FIG. 3.

In addition to elevation and intensity data, each measurement is referenced by the encoder 16, and such reference values are preferably linked to geospatial coordinates associated with the location of the system 10 when each measurement is taken. The geospatial coordinates are provided by a Global Positioning System (or Global Navigation Satellite System (GNSS)) device 32 in communication with the assessment system processor 22. These position reference values are stored in the high speed storage apparatus 20 for later analysis.

Based on implementation specific configuration parameters provided by the system processor 22 as inputs into the 3D sensor multiplexed trigger and synchronization processor 12, any number of equal distance (synchronized to the high resolution displacement encoder) and multiplexed sensor trigger signals can be generated. An example embodiment uses two separate multiplexed 3D sensor trigger signals 34 as shown for example in FIG. 1. The required inputs for the trigger and synchronization processor 12 include Encoder Longitudinal Pulse Interval (distance) 36, Maximum Sensor Sample Rate (samples per second) 38, Desired Longitudinal Sample Interval (distance) 40, and Maximum Survey Speed (velocity) 42 as shown for example in FIG. 1 and FIG. 3. Sensor trigger signals are generated and sent to the respective sensors including a first sensor trigger signal 34A, a second sensor trigger signal 34B, a third sensor trigger signal 34C, and an $N^{th}$ sensor trigger signal 34D.

Figure 4:
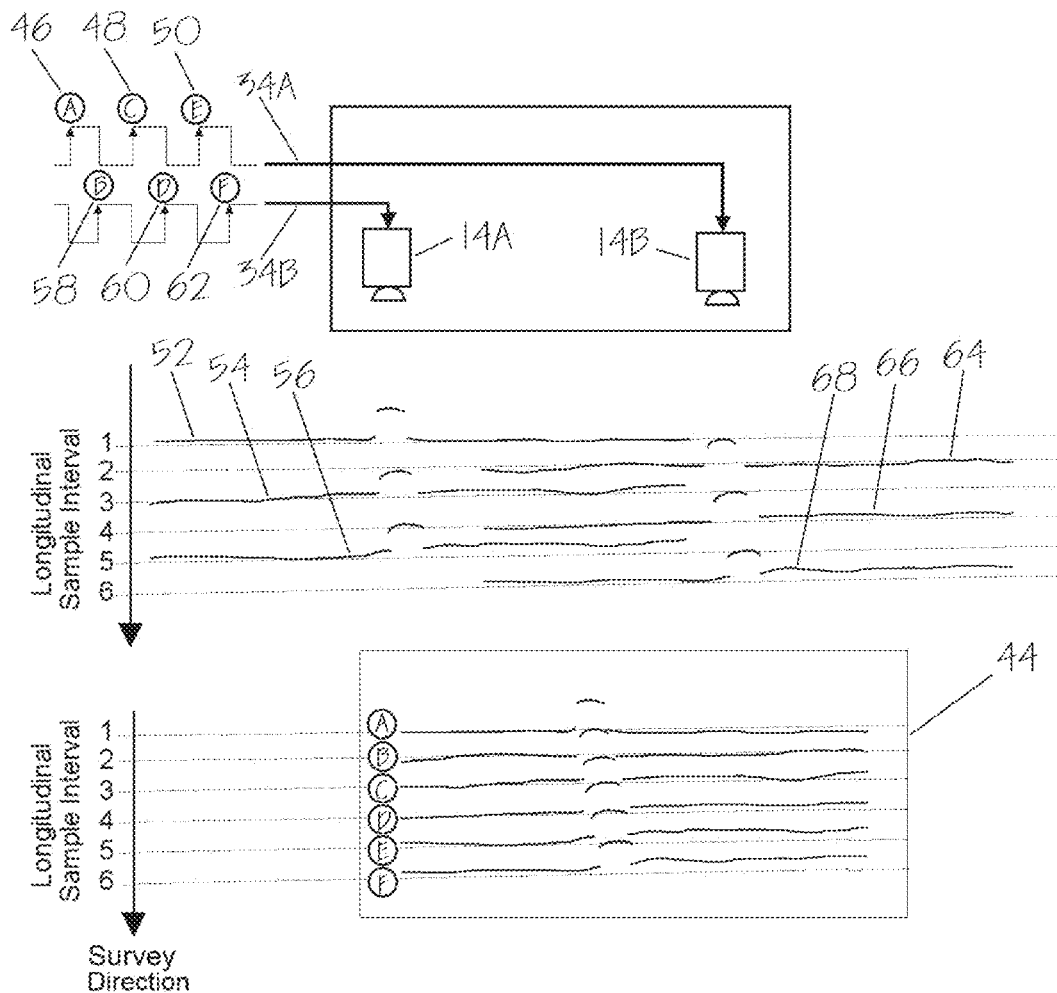
FIG. 4 shows a schematic view including data collection and data de-multiplexing for a two sensor system.

FIG. 4 presents a schematic view showing the de-multiplexed data 44 from a two sensor system. During data collection, the trigger and synchronization system 12 produces signals which trigger the two sensors 14A and 14B to alternately collect elevation profiles. In this example, the rising edge of each trigger channel (first sensor 34A trigger and second sensor 34B trigger in FIG. 4) initiates the collection of single instantaneous elevation profiles at uniform fixed longitudinal distances along the survey path. The odd trigger pulses (46, 48, and 50 in FIG. 4) initiate data collection for the first sensor 14A to provide first sensor first sample data 52, first sensor second sample data 54, and first sensor third sample data 56; and the even trigger pulses (58, 60 and 62) initiate data collection for the second sensor 14B to provide second sensor first sample data 64, second sensor second sample data 66, and second sensor third sample data 68. The multiplexed 3D elevation data is stored in the data storage apparatus 20 as a separate data file for each sensor. Linear position references are logged for each recorded elevation profile (Enclosure #, Sensor #, encoder count #). This linear referencing information from all sensors is preferably logged in a single file.

During data de-multiplexing the logged linear position reference preferably is used to correctly sequence and combine elevation/intensity scans from individual sensors into a single consolidated file. The linear reference count identifies any sensor collection errors (missing scans from any sensor) and allows correctly de-multiplexing the input sensor data files even in the event that scan errors have occurred.

FIG. 5A, FIG. 5B and FIG. 5C show the visual results of de-multiplexing two separate sensor channels (visual representation of data 70A from the first sensor 14A shown in FIG. 5A and visual representation of data 70B from the second sensor 14B shown in FIG. 5B) into a consolidated 3D data file 72 shown in FIG. 5C. In this example the first and second input sensor data 70 have a longitudinal sample separation of 6 mm, and the resulting de-multiplexed output data file 72 has an effective longitudinal sample separation of 3 mm.

Figure 6:
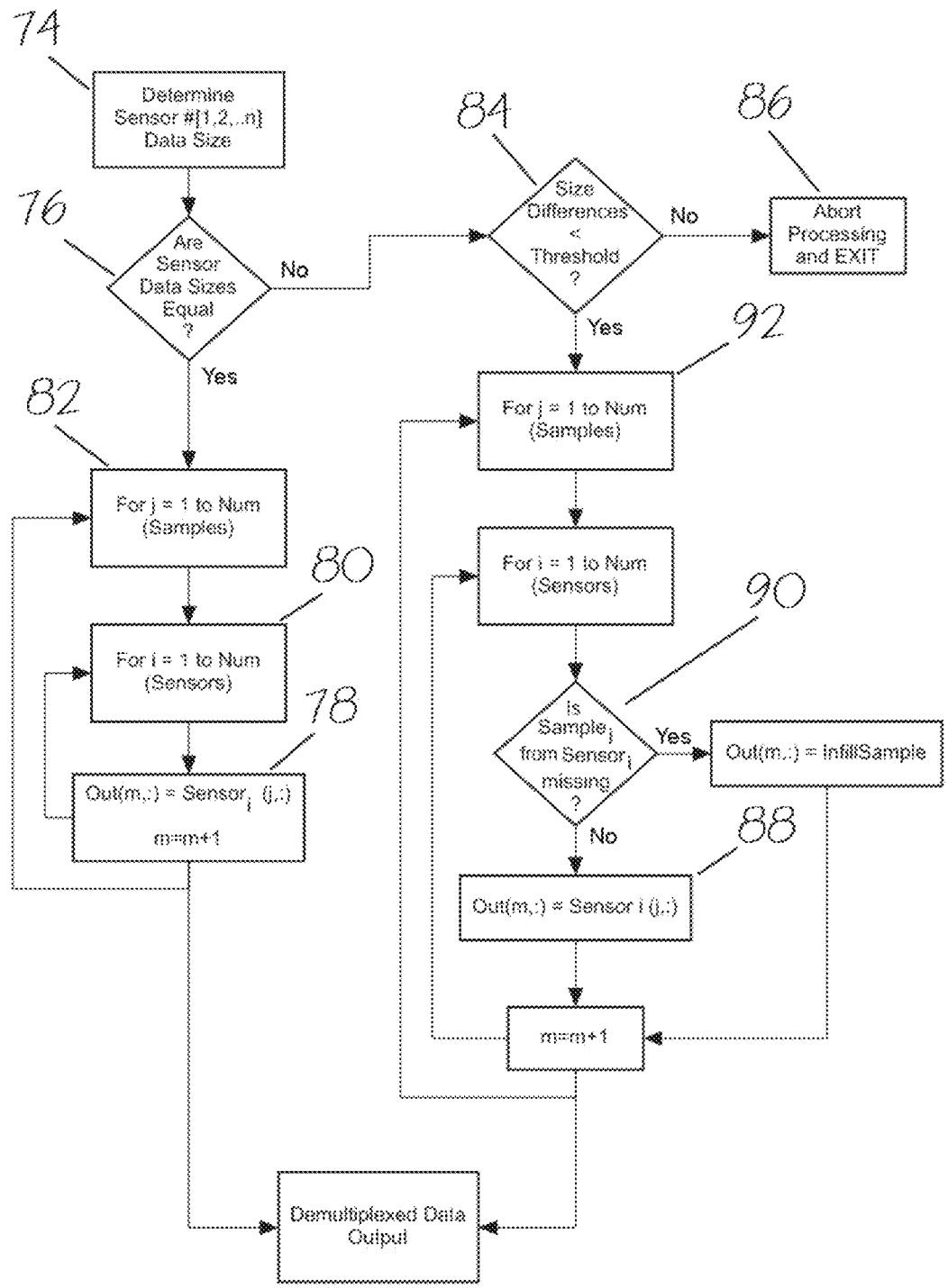
FIG. 6 shows a detailed flow chart for a multiple sensor de-multiplexing system.

FIG. 6 shows a detailed flow chart for a multiple sensor de-multiplexing system. The approach includes sensor data file size determination, data de-multiplexing and data error recovery. The method is applicable for use with any number of multiplexed sensors. The first step determines the size of data from each sensor (step 74). Individual sensor data sizes are compared to ensure they are of equal size (step 76). If the sensor files are equal size, the de-multiplexed output file is created (step 78) by selecting the same numbered sample from each multiplexed sensor data file in sequential order (step 80). This process is repeated for each sample contained in all individual sensor data files (step 82).

If any of the data files are found to differ in size (representing a sensor error condition), the magnitude of the size difference is compared against the maximum permissible difference threshold (step 84). Any sensor file size differences which exceed the maximum difference threshold (step 84) result in the termination of all processing (step 86). In cases where all detected file size differences are less than the maximum permissible difference threshold (step 84), processing is initiated, and the de-multiplexed output file is created (step 88) by testing the validity of each multiplexed sensor data sample (step 90). If the current sensor data sample is valid (step 90), it is copied to the de-multiplexed output file (step 88), if the sample is invalid an approximated sample fabricated and this infill sample is copied to the de-multiplexed output file (step 88). This process is repeated for each sample contained in all individual sensor data files (step 92).

Figure 7:
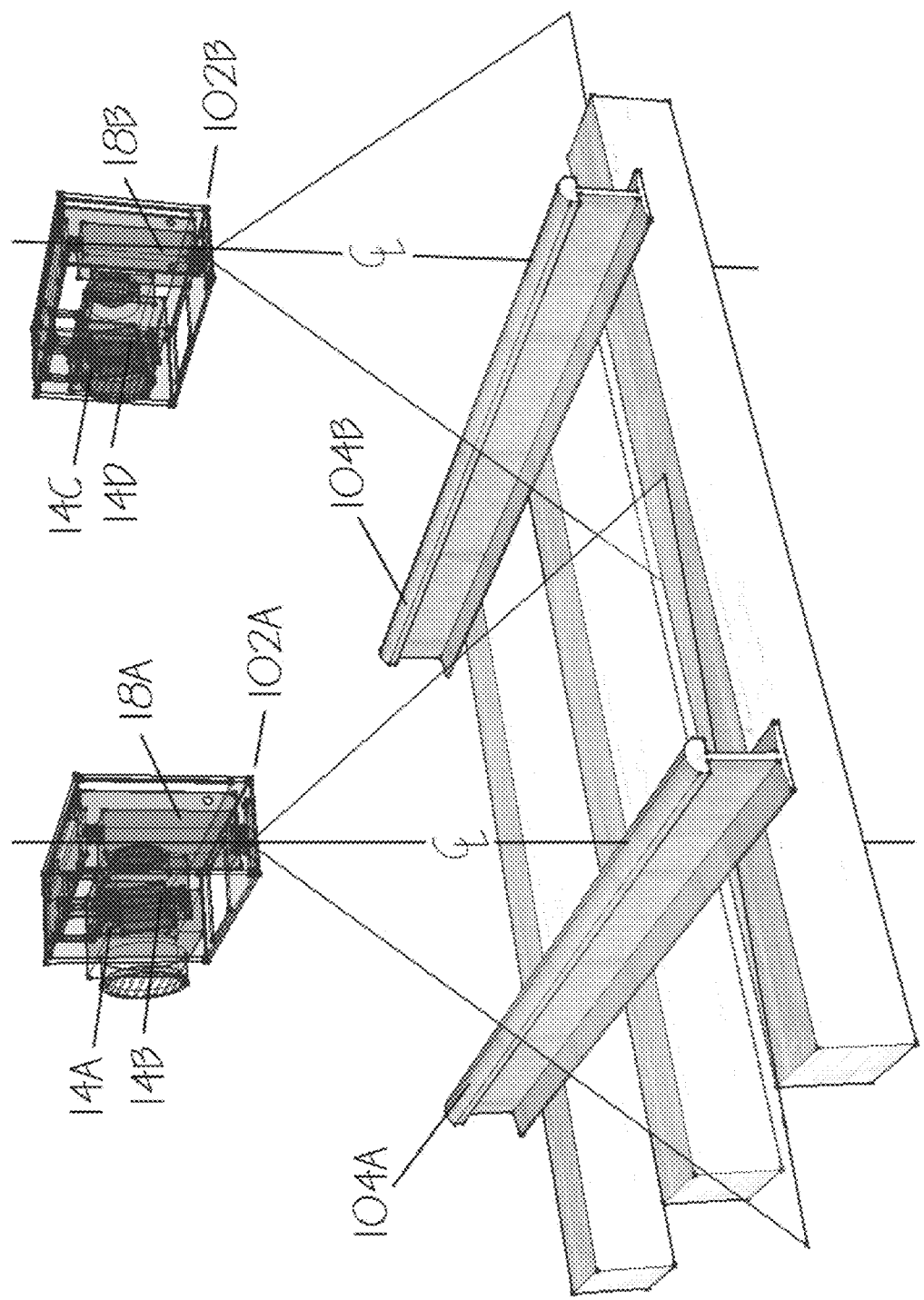
FIG. 7 shows the preferred sensor orientation and location with respect to the track bed rails.
Figure 8:
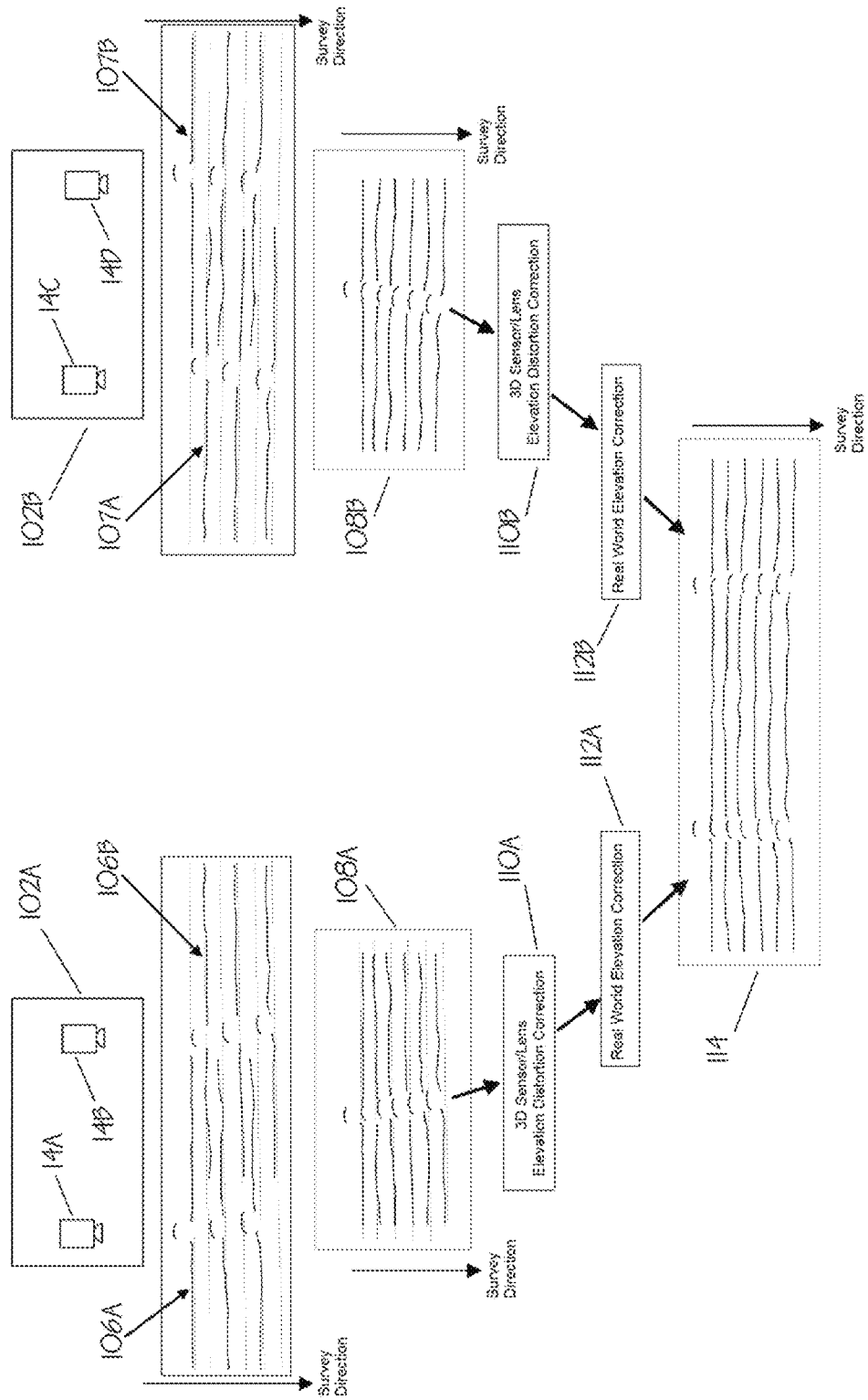
FIG. 8 shows a somewhat schematic view of data being collected, distortion and real world coordinate corrected and merged from two enclosures, each with two sensors.

Two separate sensor measurement positions are used to maximize the elevation and intensity data collection coverage on both sides of each rail. These sensor enclosure positions are as shown in FIG. 7. A first sensor enclosure 102A measurement position is centered above a left rail 104A and a second sensor enclosure 102B measurement position is centered above a right rail 104B. Multiple synchronized sensors at each enclosure are used to improve sample rate performance. For example, sensors 14A and 14B are contained in the first enclosure 102A with the first light line projector 18A and a third sensor 14C and a fourth sensor 14D are contained in the second enclosure 102B with a second light line projector 18B as shown for example in FIG. 7. First multiplexed elevation/intensity data 106A and 106B gathered from the first enclosure 102A and second multiplexed elevation/intensity data 107A and 107B gathered from the second enclosure 102B are de-multiplexed to produce a left rail data file 108A and a right rail data file 108B. The left rail data file 108A and the right rail data file 108B are then lens distortion corrected as shown in block 110A for the left rail data and block 110B for the right rail data. The left rail data file 108A and the right rail data file 108B are also real world elevation corrected as shown in block 112A for the left rail data and block 112B for the right rail data. The data files are then finally merged to produce a full width 3D elevation map 114 as shown in FIG. 8.

Figure 9A:
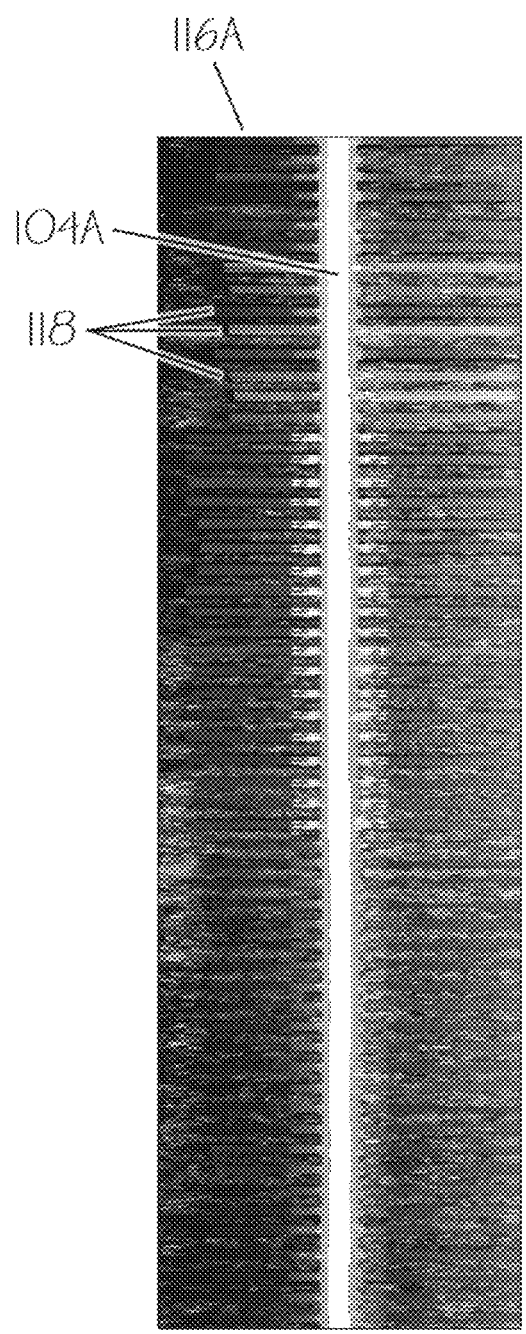
FIG. 9A shows an image of pixel elevation data of the left side of a railway track bed.
Figure 9B:
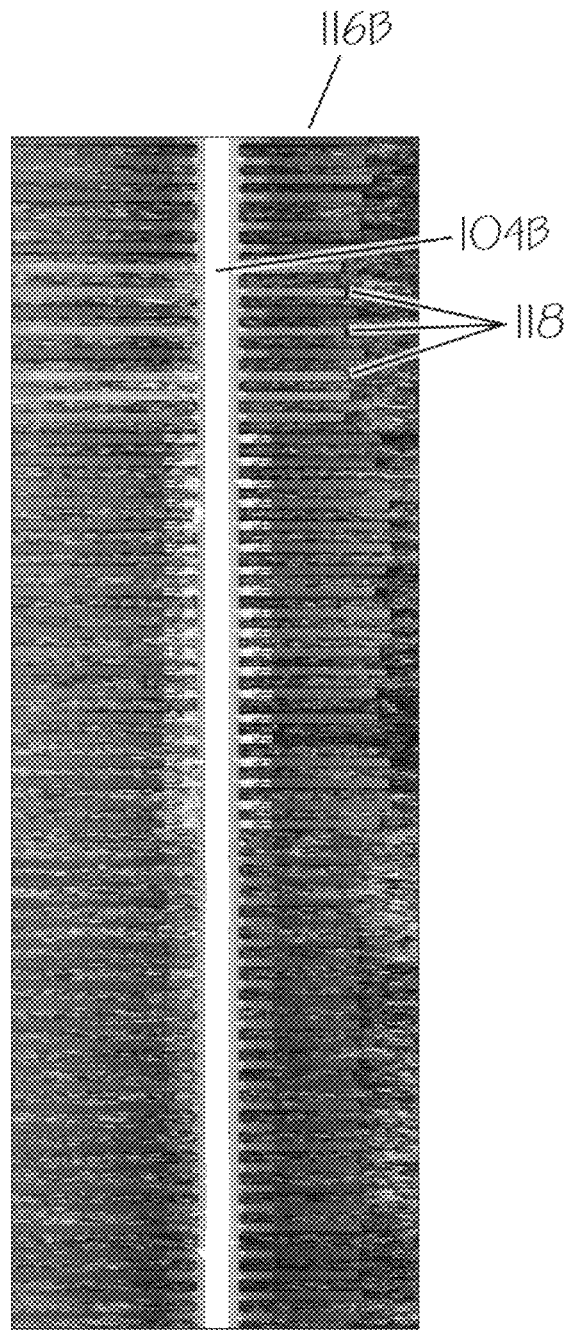
FIG. 9B shows an image of pixel elevation data of the right side of a railway track bed.
Figure 10A:
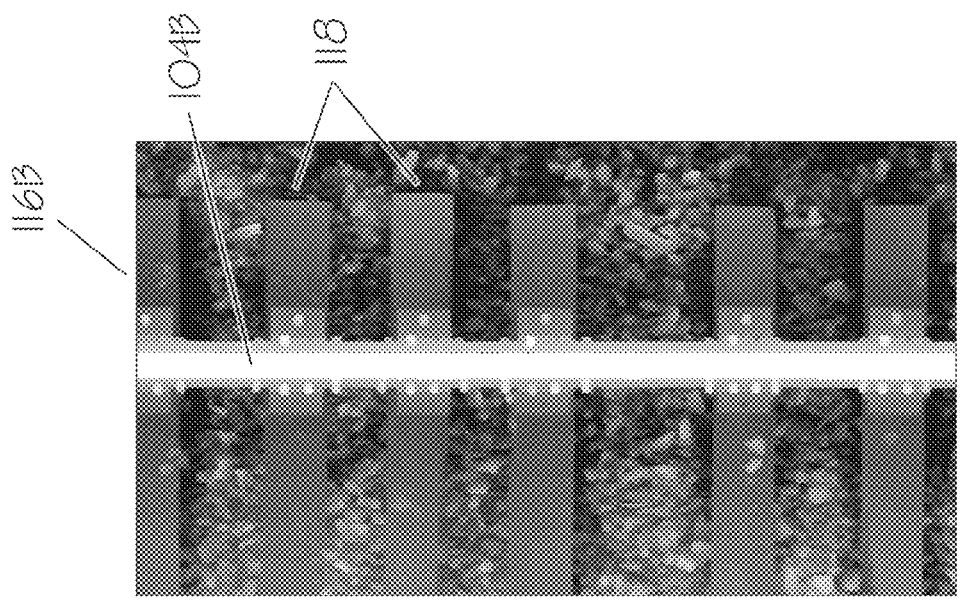
FIG. 10A shows a close-up image of detailed pixel elevation data of the left side of a railway track bed.
Figure 10B:
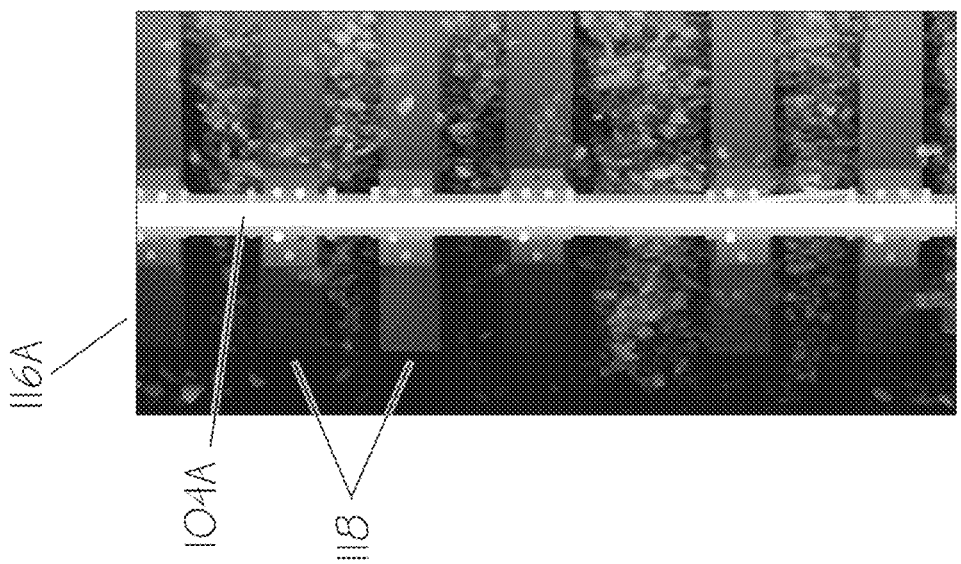
FIG. 10B shows a close-up image of detailed pixel elevation data of the right side of a railway track bed.
Figure 11:
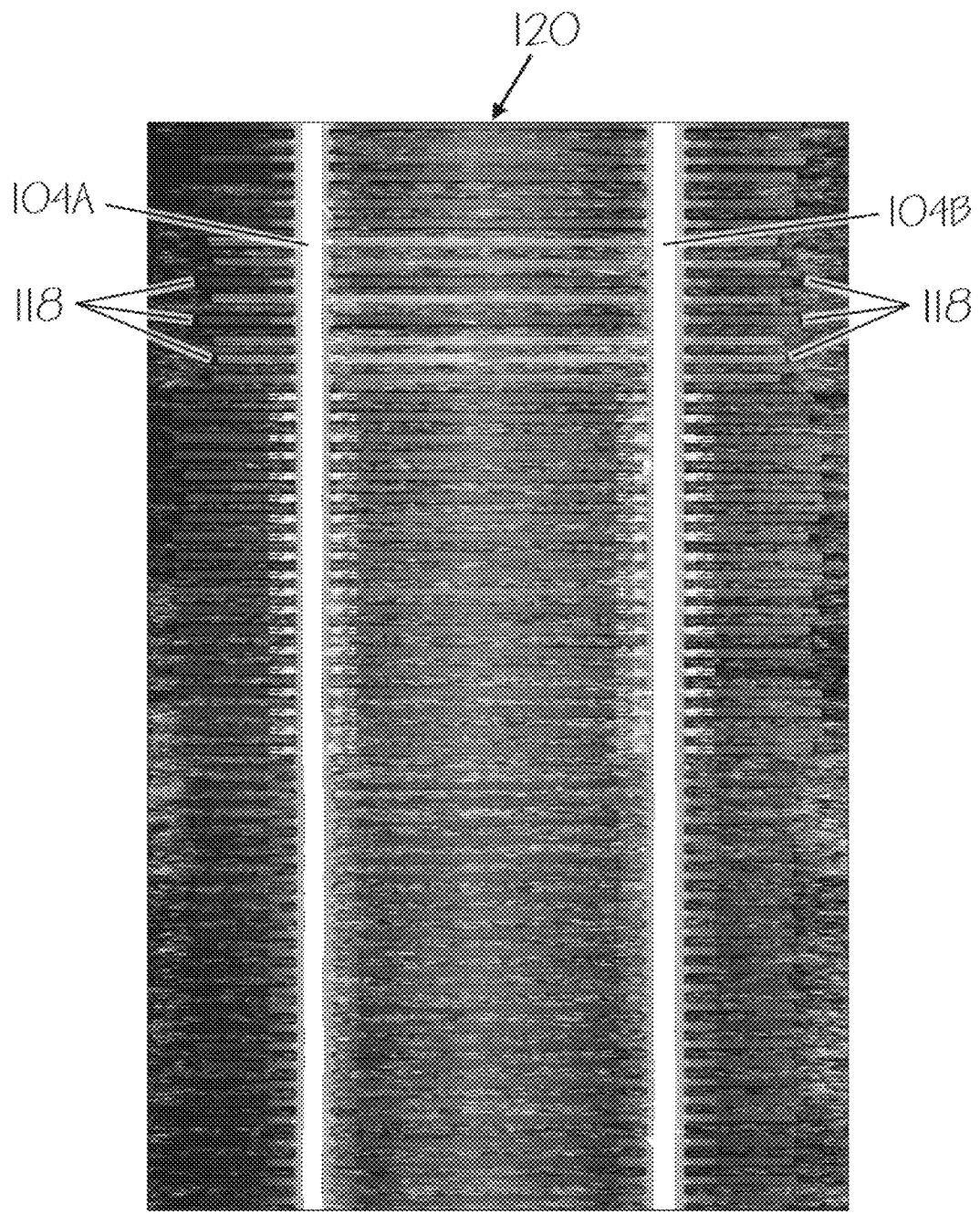
FIG. 11 shows a full track bed width 3D elevation map combining the data shown in FIGS. 9A and 9B.
Figure 12:
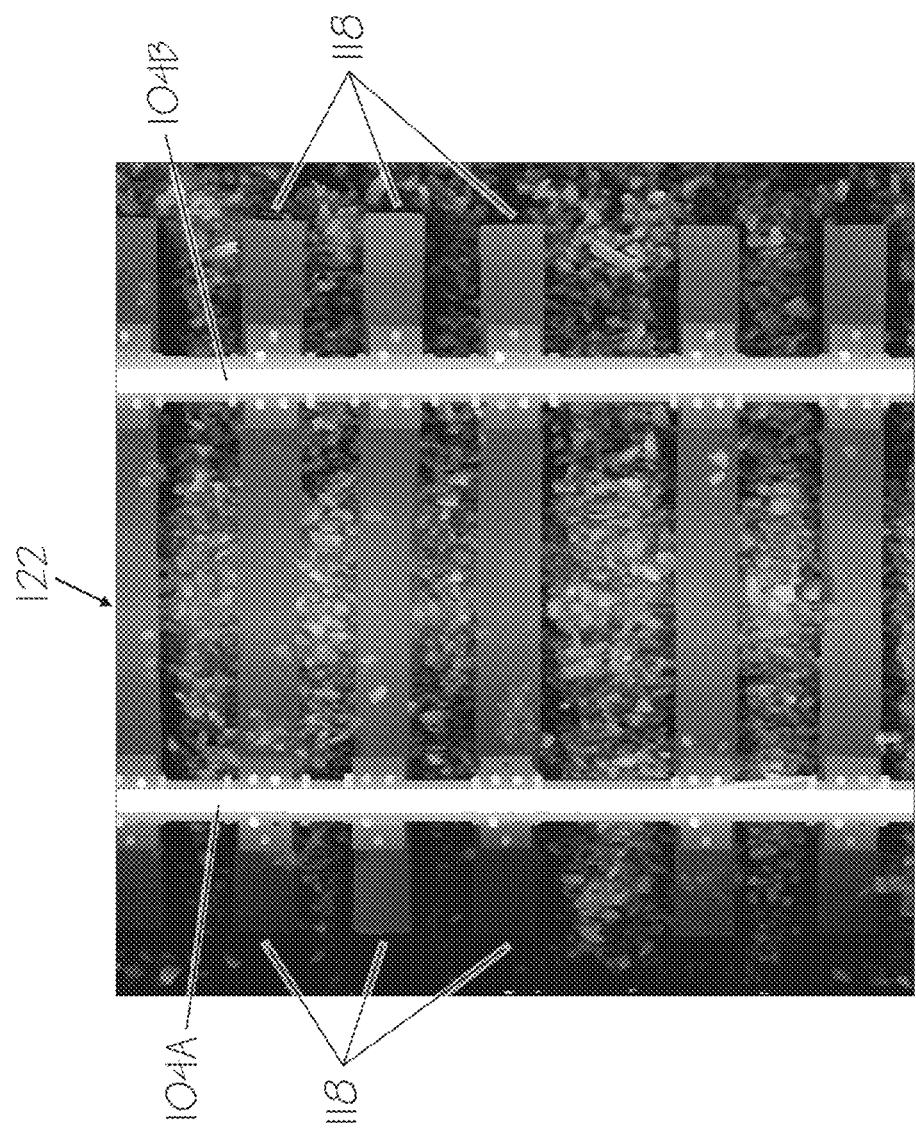
FIG. 12 shows a close-up view of a portion of the full track bed width 3D elevation map from FIG. 11.

FIG. 9A shows left side sensor pixel elevation data 116A including the left rail 104A and a plurality of ties 118. FIG. 9B shows right side sensor pixel elevation data 116B including the right rail 104B and the plurality of ties 118. The individual sensor pixel elevation data files 116 represent a railway track bed section about 30 meters long and about 1.6 meters wide. A detailed close-up view of a portion of the left side pixel elevation data 116A is shown in FIG. 10A and a detailed close-up view of a portion of the right side sensor pixel elevation data 116B is shown in FIG. 10B. The sensor pixel elevation data 116 are corrected for lens spherical and other sensor distortions 110, and converted from pixel elevation to real-world coordinates 112 and then merged to form a full width elevation map 114 as shown in FIG. 8. A full width sensor pixel elevation data file 120 is shown in FIG. 11. A close up view of a first portion of the full width sensor pixel elevation data file 122 is shown in FIG. 12.

Figure 13:
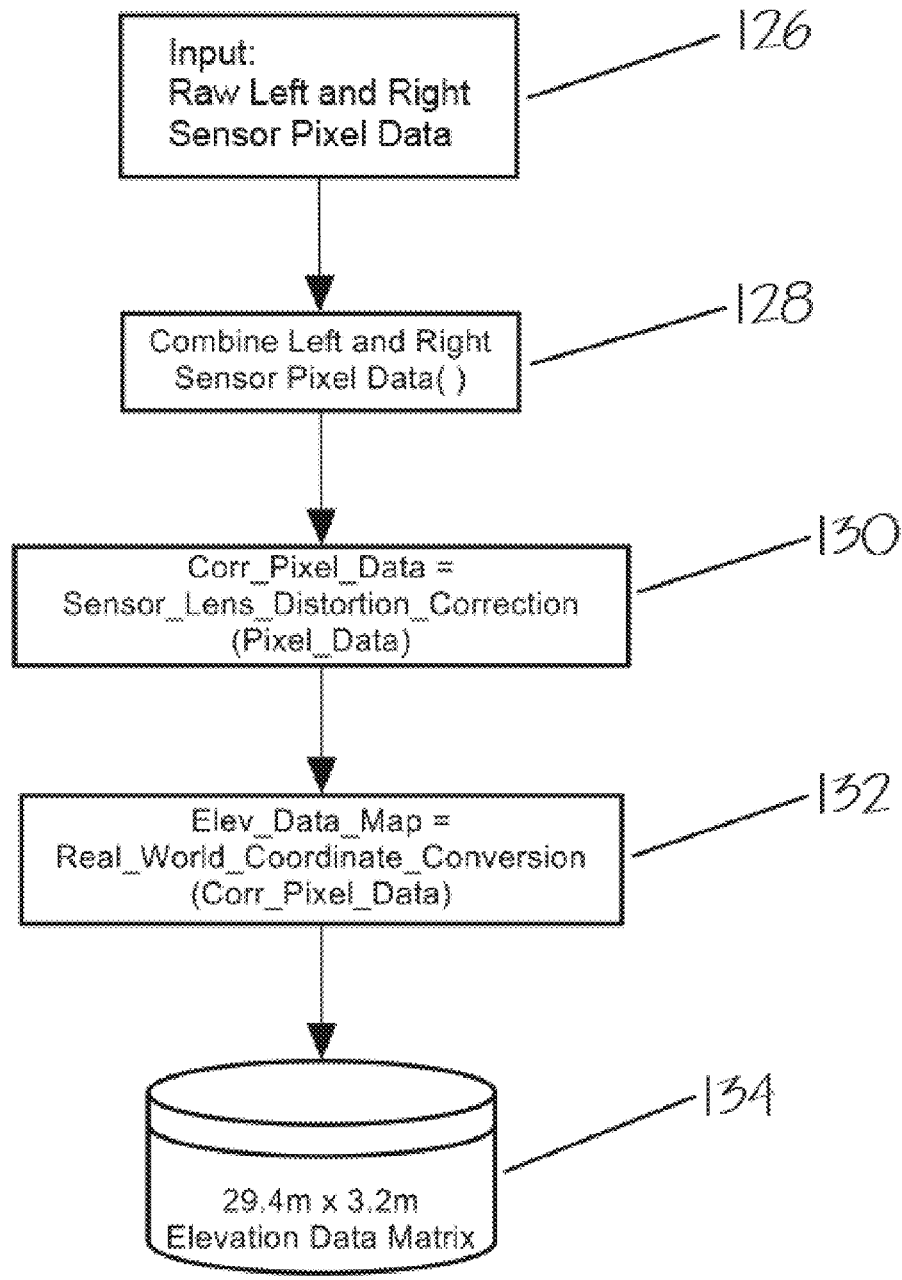
FIG. 13 shows a flow chart that illustrates steps involving an elevation distortion correction method with an output of true elevation data.

FIG. 13 shows a flowchart of the sequence of steps in creating the 3D elevation maps including combining left and right sensor data (step 128), correcting for sensor and lens distortion (step 130), and real world coordinate conversion (step 132) to provide a 3D elevation data matrix (step 134) representing elevation and intensity data for a specified area of track, preferably having a size of about 30 meters by about 3.2 meters.

Figure 14:
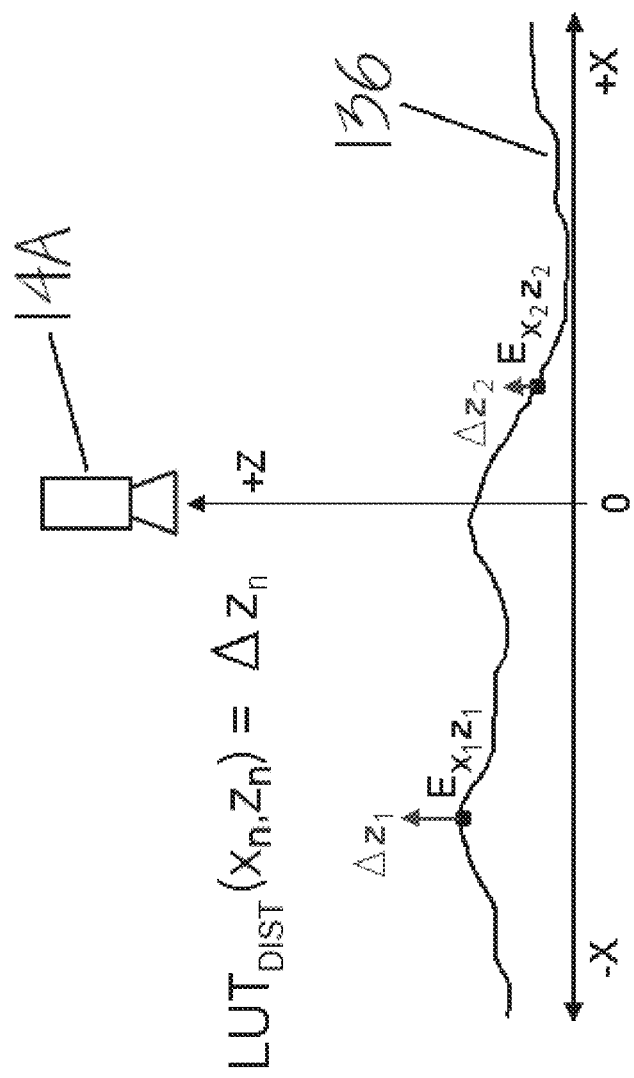
FIG. 14 shows a schematic view of how elevation distortion is corrected based on measured elevation (Zn) and lateral offset (Xn) values.

The sensor and lens distortion correction method uses a lookup table (LUT) to remove distortion effects in the measured elevation profile. Separate sensor and lens pair elevation correction lookup tables ($LUT_{DIST}$) return scalar vertical elevation correction values ($\Delta Z_n$) for each raw elevation profile (X, Z) location 136 as shown in FIG. 14 where X is the lateral offset and Z is the measured pixel elevation.

Figure 15:
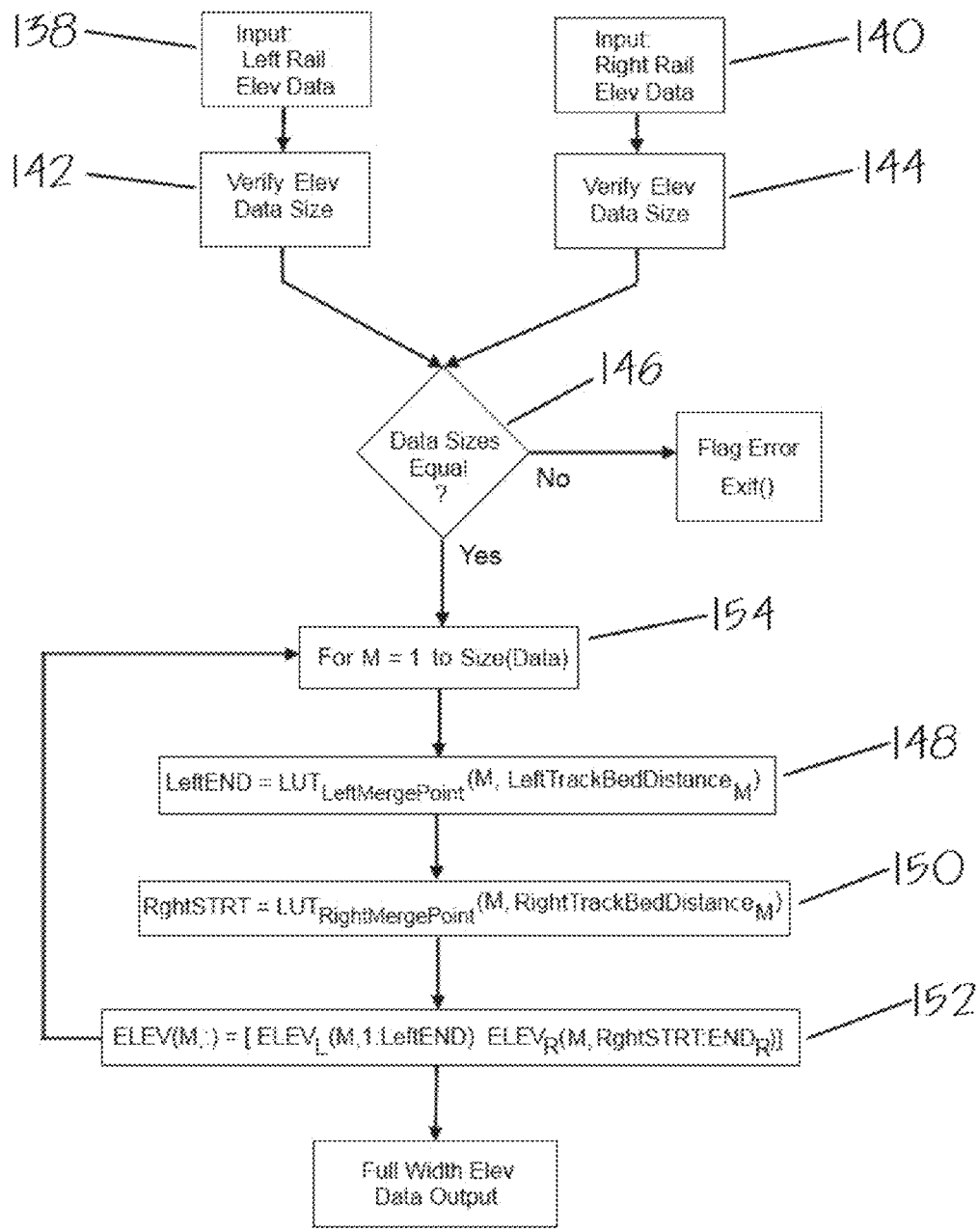
FIG. 15 shows a flowchart of steps of combining left and right 3D track data and merging the data into a single 3D elevation data matrix.

Lookup tables are also used to determine the correct merge points for each corresponding left and right channel scan lines. As shown in FIG. 15, the track assessment system processor 22 accesses left rail elevation data (step 138) and right rail elevation data (step 140). The data size of the left rail elevation data is verified (step 142) and the data size of the right rail elevation data is verified (step 144). If the left and right elevation scan lines are the same size (step 146) then the left channel scan line end merge point is determined based on the distance from the left sensor to the track bed surface (step 148), and the right channel scan line start merge point is determined based on the distance from the right sensor to the track bed surface (step 150). The individual left ($ELEV_L$) and right ($ELEV_R$) scan lines are then merged based on the left channel end point and the right channel start point (step 152). This process is repeated for all scan lines in the elevation map (step 154).

Figure 16:
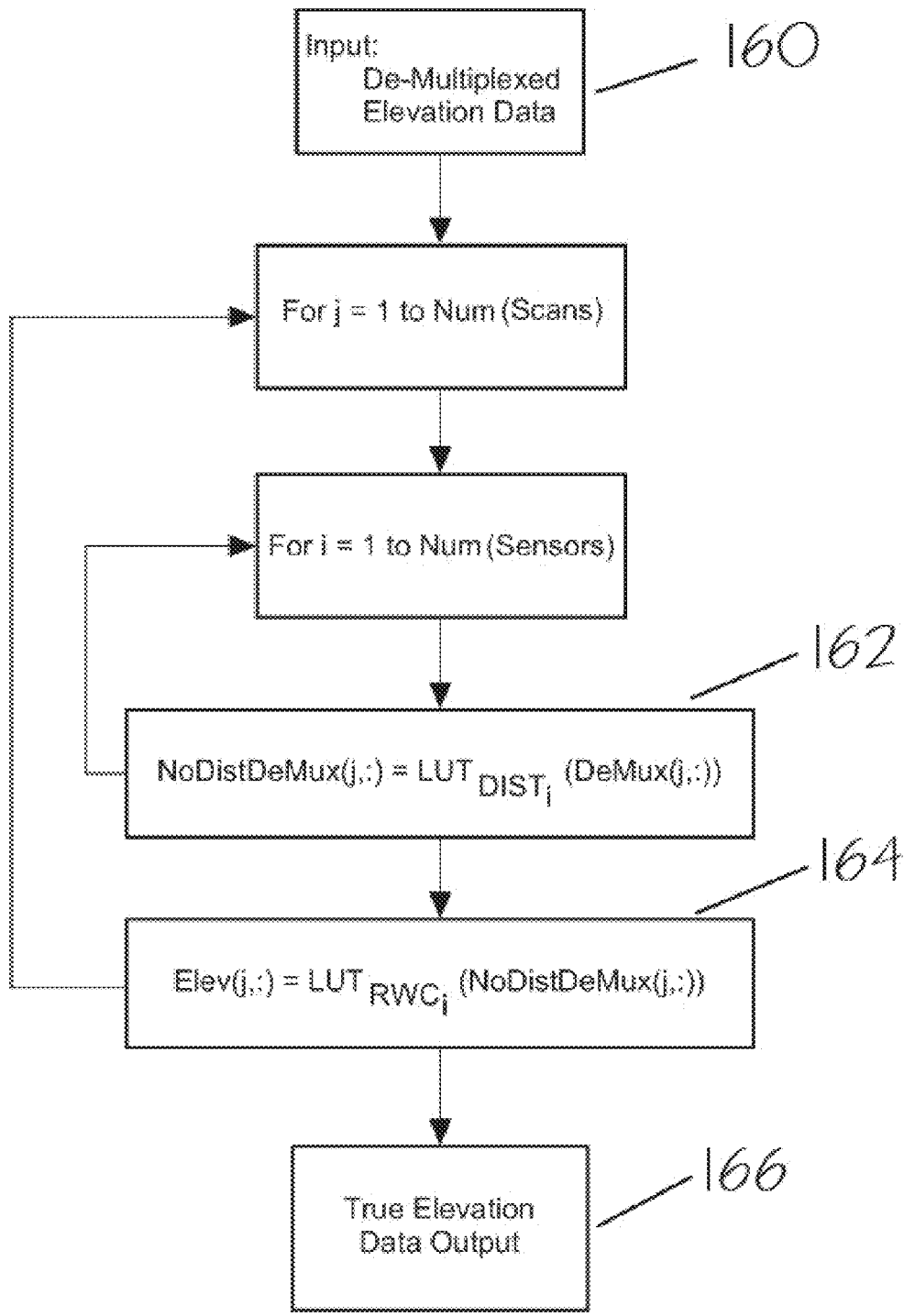
FIG. 16 shows a flow chart that illustrates steps involving left and right data streams merging and a conversion of data to real-world coordinates.

Two separate lookup tables are used to convert from 3D sensor pixel elevation coordinates to engineering units (real world coordinates). FIG. 16 shows an elevation distortion correction method flow chart with an output of true elevation data. Using the de-multiplexed sensor pixel elevation data files as input (step 160), sensor specific lens distortion lookup tables $LUT_{DIST}$ are used to produce the distortion corrected de-multiplexed scan lines (NoDistDeMux) (step 162). Each corrected sensor pixel unit based NoDistDeMux scan line is then real world coordinate corrected using the $LUT_{RWC}$ lookup table (step 164). The result is the true elevation profiles (step 166). This process is preferably completed for all elevation map files. Once merged, the full width 3D elevation map files represent an accurate 3D model of the surveyed track bed, as shown for example in FIG. 11.

Figure 17:
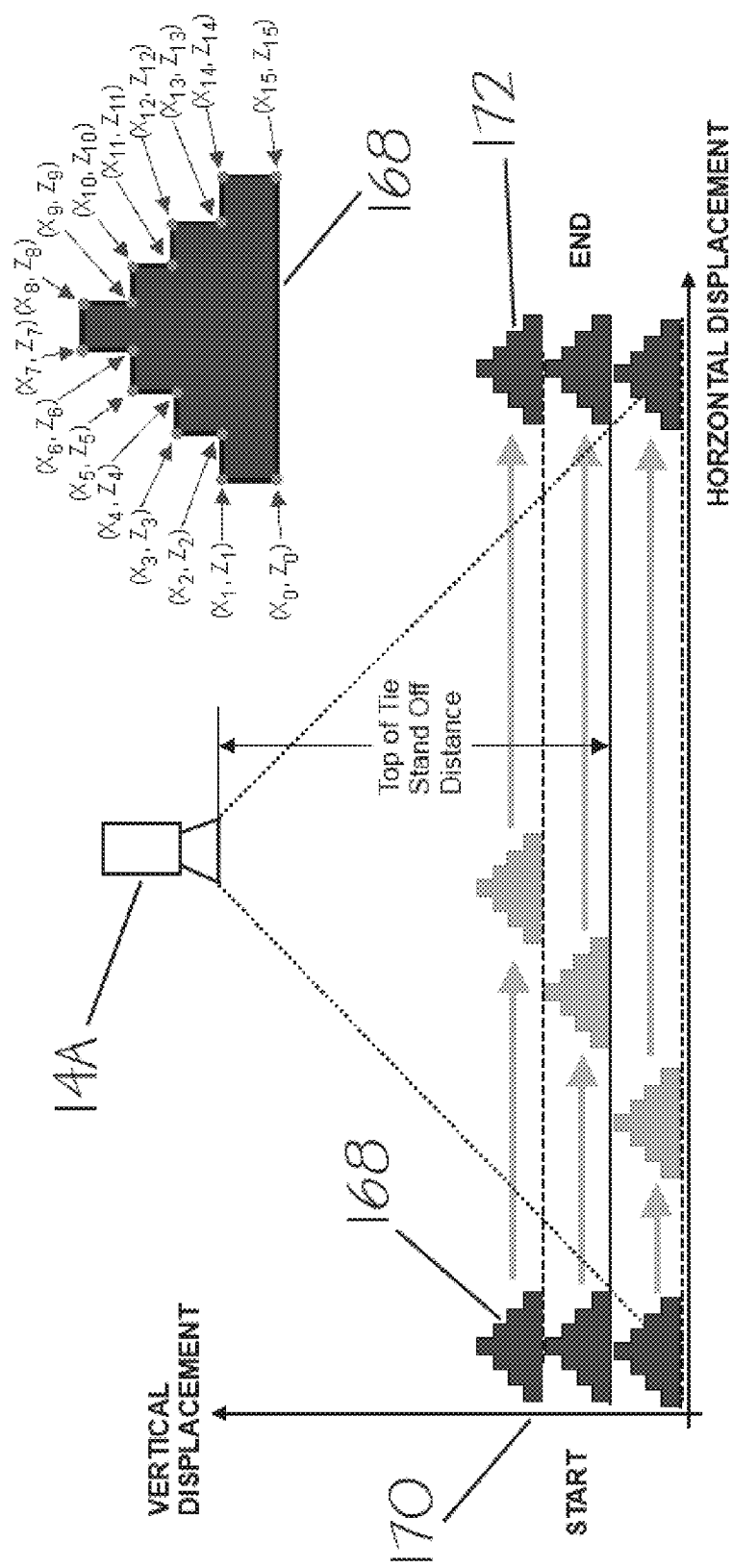
FIG. 17 shows a schematic view of a step pyramid based calibration block positioned at various positions within a sensor field of view.

3D sensor distortion and coordinate calibration can be accomplished for example using a step pyramid based calibration block 168 positioned at various positions within the sensor field of view as shown for example in FIG. 17. The resulting referenced elevation measurements are made both above and below the nominal design sensor standoff distance and can provide distortion and real world elevation corrections for objects in the entire field of view of the sensor. The calibration block edges (16 corners for the block used in this example) are detected and the sensor measured elevations calculated for each position as the block 168 is moved from a Start position 170 to an End position 172 producing reference elevation locations throughout the sensor transverse field of view. The relationships between the measured and the reference elevations are then calculated for each sensor/lens combination. The individual sensor lookup tables embody these measured to actual elevation conversion relationships.

Although two sensors per rail are described in the foregoing examples, the number of sensors can vary, and a higher number of sensors will decrease the longitudinal spacing between samples of the final merged elevation data files for the same survey speed. The number of sensors required (and therefore the number of trigger signals) is determined by Equation 1 below as follows:

$$N_{Sensors} = \text{ceil}\left(\frac{\text{Survey Speed}}{\text{Sensor Rate} \times \text{Sample Interval}}\right) \quad \text{Equation 1}$$

Where;
  $N_{Sensors}$=the number of 3D measurement sensors required to achieve the desired measurement interval
  Survey Speed=the target track inspection and assessment speed
  Sensor Rate=the nominal maximum measurement rate of the 3D sensor
  Sample Interval=the target fixed longitudinal sample (measurement) interval
  ceil( )=is the mathematical Ceiling function (next largest integer)

For example, for an embodiment which uses 3D sensors with a Maximum Sampling Rate of 5000 samples/second, and a Maximum Survey Speed of 27 meters/second (97 kph), and a Desired Longitudinal Sample Interval of 0.003 meter/sample, the number of sensors would be as follows:

$$N_{Sensors} = \text{ceil}\left(\frac{27 \text{ m/sec}}{5000 \text{ samples/sec} \times 0.003 \text{ m/sample}}\right) = 2 \quad \text{Equation 2}$$

The trigger and synchronization processor 24 calculates the correct encoder divider using Equation 3 below as follows:

$$NDivide_{Encoder} = \frac{\text{Sample Interval} \times N_{Sensores}}{\text{Encoder Interval}} \quad \text{Equation 3}$$

Where;
  $NDivide_{Encoder}$=the division factor required to convert the displacement encoder interval to the desired measurement interval
  Sample Interval=the target fixed longitudinal sample (survey measurement) interval
  $N_{Sensors}$=the number of 3D measurement sensors being employed
  Encoder Interval=the longitudinal sample interval of the displacement encoder For example, in an embodiment described herein, using a longitudinal survey sample interval of 0.003 m, a displacement encoder longitudinal sample interval of 0.00023 m and 2 sensors, using Equation 4, the trigger and synchronization processor 24 would determine the following:

$$NDivide_{Encoder} = \text{round}\left(\frac{0.003 \text{ m} \times 2}{0.000231 \text{ m}}\right) = 26 \quad \text{Equation 4}$$

Given the $N_{Sensors}$ and $NDivide_{Encoder}$ parameters, a sensor per channel multiplexer delay can be calculated by the trigger and synchronization processor 24 using Equation 5 below as follows:

$$Delay_{Channel} = \frac{NDivide_{Encode} \times (Channel_{Num} - 1)}{N_{Sensors}} \quad \text{Equation 5}$$

Where;
  $Delay_{Channel}$=the number of displacement encoder pulses required to ensure that each 3D sensor measurement is synchronized and equally spaced along the survey path
  $NDivide_{Encoder}$=the division factor required to convert the displacement encoder interval to the desired measurement interval
  $Channel_{Num}$=the 3D sensor channel number (ranging from 1 to $N_{Sensors}$)
  $N_{Sensors}$=the number of 3D measurement sensors being employed In the example two sensor per rail embodiment above the sensor per channel multiplexer delay, (delay defined in terms of input encoder pulse numbers) would be as defined below using Equation 6:

$$(Delay_1, Delay_2) = \frac{26 \times (\{1, 2\} - 1)}{2} = \{0, 13\} \quad \text{Equation 6}$$

Where;
  $Delay_1$=the number of displacement encoder pulses required to synchronize and delay the first 3D sensor (for example 14A)
  $Delay_2$=the number of displacement encoder pulses required to synchronize and delay the second 3D sensor (for example 14B)

Figure 3:
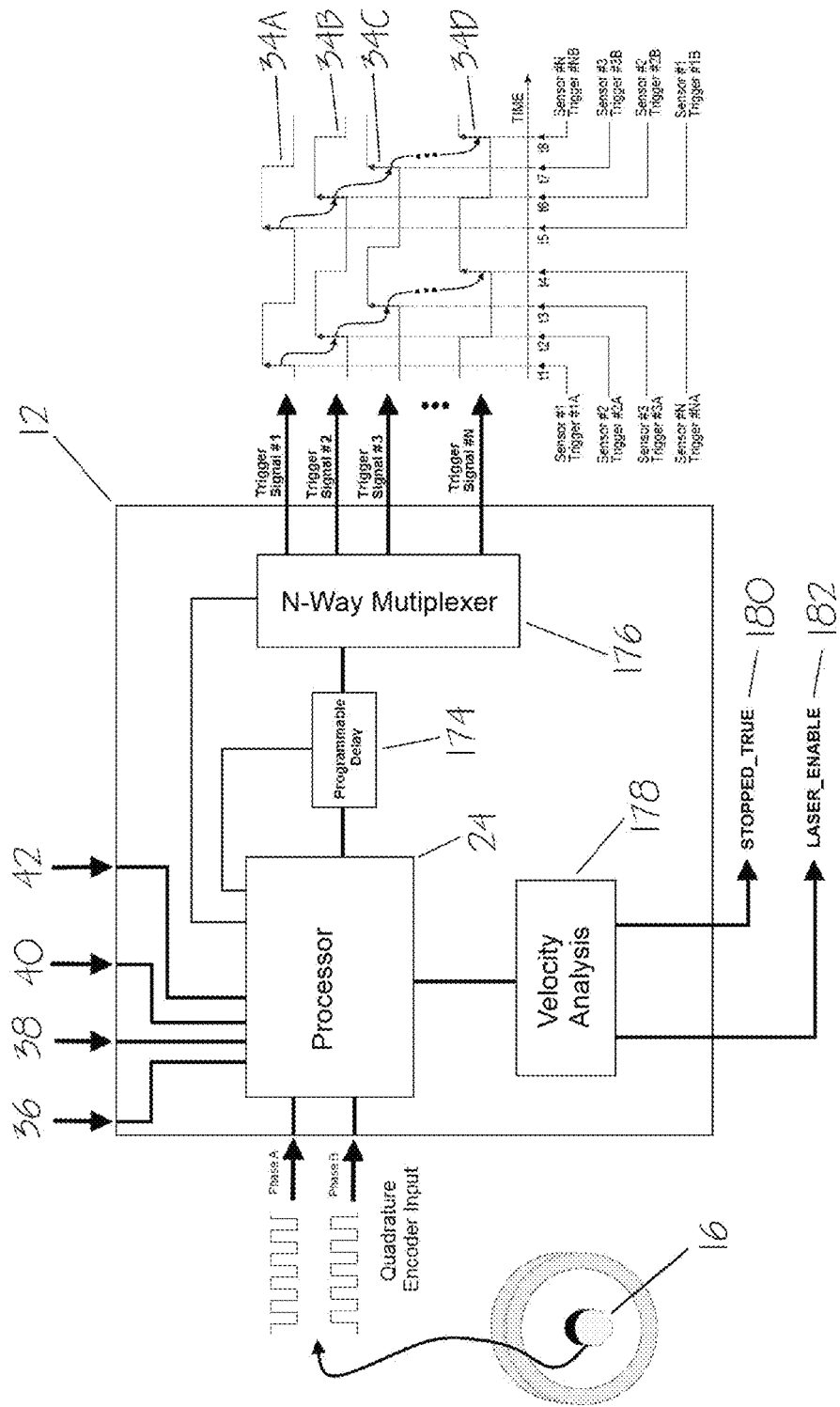
FIG. 3 shows a schematic view of a sensor multiplex and synchronization system.
Figure 18:
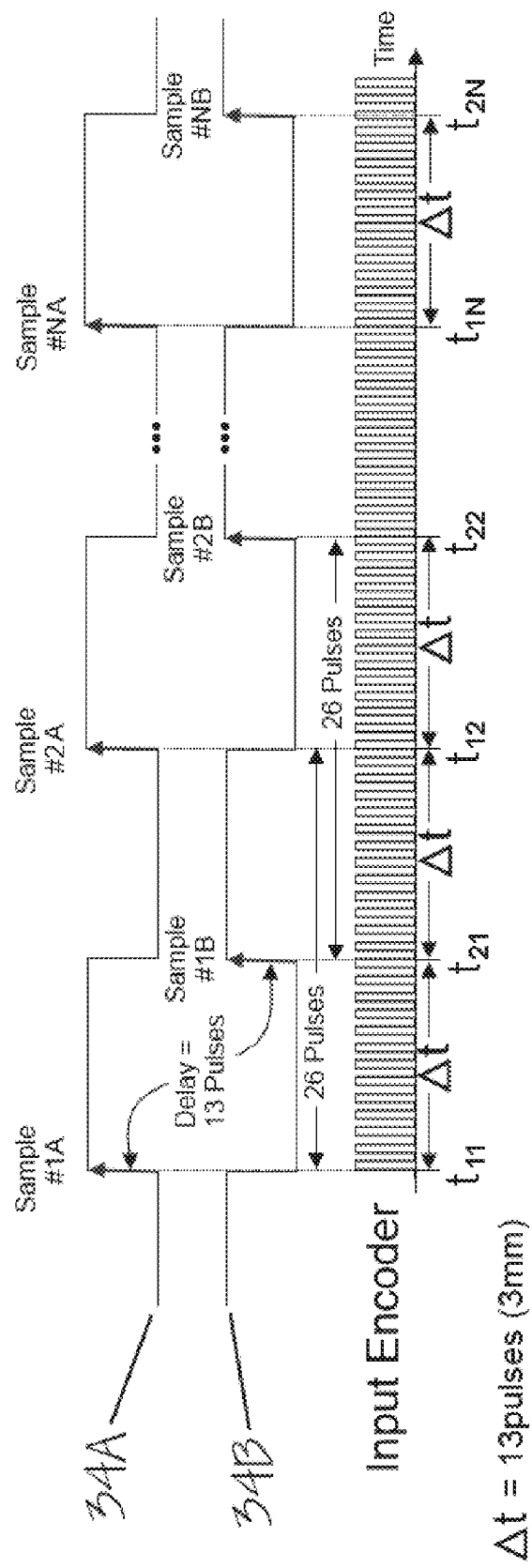
FIG. 18 shows a graphical representation of the detailed multiplexed trigger timing for a two sensor system configuration.

A trigger and synchronization system block diagram is provided for example in FIG. 3. The trigger and synchronization system 12 uses quadrature encoder inputs from wheel encoder 16, inputs for Encoder Longitudinal Pulse Interval 36, Maximum Sensor Sample Rate 38, Desired Longitudinal Sample Interval 40, and Maximum Survey Speed 42 and includes the trigger and synchronization processor 24 capable of determining the correct sensor timing and synchronization requirements given the available inputs, a programmable delay component 174 to generate any arbitrary time delayed trigger signal which can be routed to any of N external sensors by a multiplexer 176. For the example embodiment configuration presented above the trigger and synchronization system 12 would generate two sensor trigger signals 34A and 34B, each with a longitudinal distance separation of 6 mm (representing 26 input encoder pulses, regardless of survey speed), and with the second sensor trigger delayed by 3 mm (or 13 input encoder pulses), ensuring the two sensors 14A and 14B were producing 3D scan measurements which were 6 mm apart and equally spaced. This is shown graphically in FIG. 18.

The methods used by the trigger and synchronization system 12 described herein provide the ability to determine the number of sensors required to attain any required longitudinal resolution at any survey speed, given the system sensor data collection rate. Once the operational design specifications are defined and calculated, the trigger and synchronization processor 24 generates correct duration and correctly multiplexed trigger signals for all required sensors.

The sensor trigger and synchronization processor 24 also preferably produces motion status and laser interlock signals based on the signals sensed from the displacement encoder 16 and analyzed by a velocity analyzer 178 as shown in FIG. 3. In order to produce these control outputs, the trigger and synchronization processor 24 requires a quadrature input encoder stream capable of providing both displacement (movement) and direction (quadrature phase arrival time sequence) information inputs. The trigger and synchronization processor 24 includes methods and algorithms to calculate both a STOPPEDTRUE signal 180 (TRUE when the displacement encoder forward or reverse direction motion is less than a predefined programmable threshold) and a LASERENABLE signal 182 (TRUE when continuous and sustained forward or reverse direction motion is detected). A velocity analysis algorithm accumulates encoder motion counts (displacement) and direction (quadrature input phase arrival timing) over fixed time intervals to determine the effective encoder velocity vector (direction×displacement/time). The consistency of the velocity is assessed to eliminate non-uniform or erratic calculated velocities typically caused by wheel or chassis vibration while in an otherwise stopped or static state. When the magnitude of the effective instantaneous velocity vector is uniform in direction and exceeds an internal Minimum Valid Motion Velocity threshold (programmable) STOPPED_TRUE=FALSE, STOPPED_TRUE=TRUE otherwise. When the magnitude of the velocity vector exceeds the Minimum Laser Enable Velocity threshold (programmed) LASER_ENABLE is set to TRUE, otherwise LASER_ENABLE is set to FALSE. These signals are preferably generated continuously and in real-time and are provided to the track assessment system processor 22 to be distributed to other safety and data collection processes.

Figure 19:
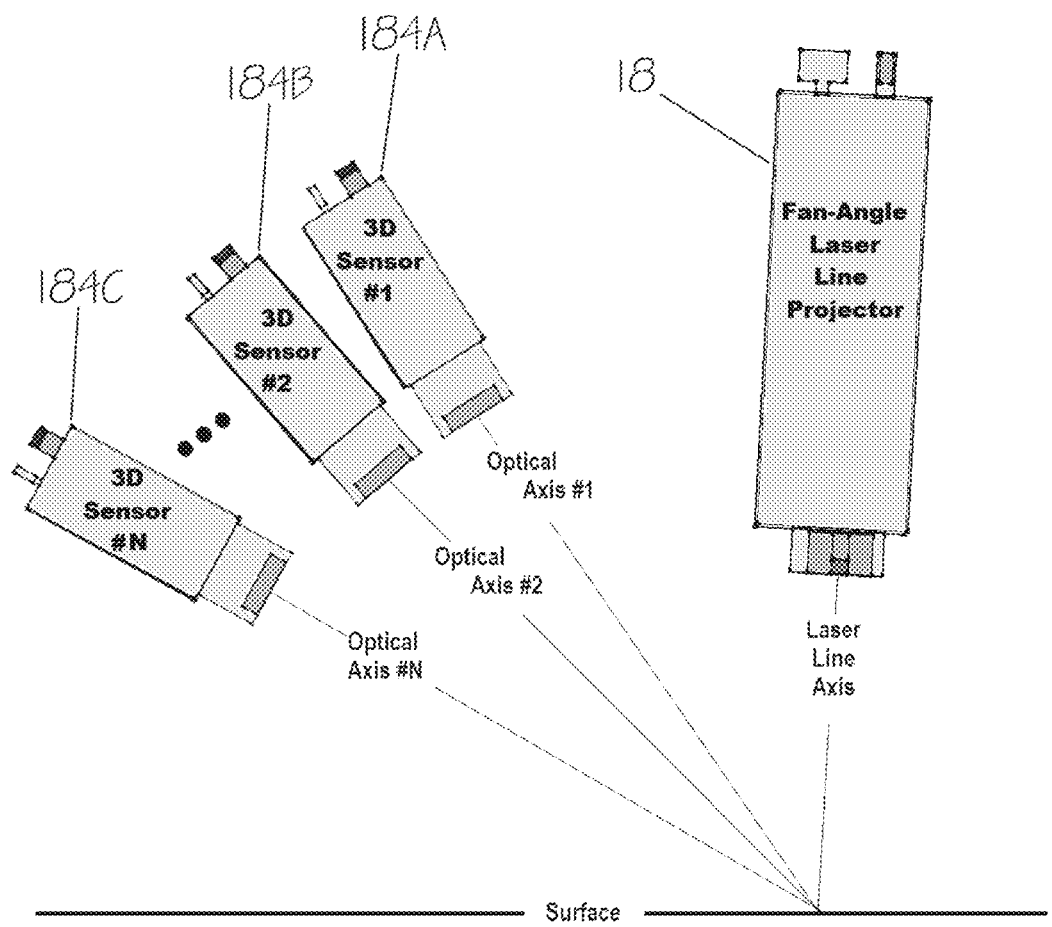
FIG. 19 shows a sensor array with N sensors, demonstrating that multiple sensors may be used to increase system resolution.

FIG. 19 shows an embodiment with a first sensor 184A, a second sensor 184B and an $N^{th}$ sensor 184C wherein N equals an ordinal number, and illustrates how any number of sensors may be used to increase the resolution of the track measurement system 10. FIG. 3 shows a schematic view of a wheel encoder 16 and at least three sequential sensor trigger signals including a first trigger signal phase controlling a first sensor trigger output signal function 34A, a second trigger signal phase controlling a second sensor trigger output signal 34B, and an $N^{th}$ sensor trigger signal phase controlling the $N^{th}$ sensor trigger output signal 34D wherein the trigger rate is a function of encoder rotation rate. In this example embodiment, the use of a number of optically aligned and sequentially triggered 3D sensors 184 produces higher resolution (closer longitudinal spacing) elevation profiles at higher speeds. Competitive systems are limited to approximately 5000 profiles per second (with 6 mm/0.25 in between samples at 100 kph/60 mph). The high density and high resolution 3D surface profiles produced by the track measurement system 10 described herein improve the feature classification and parameter measurement accuracy capabilities and can provide a resolution of 5,000 profiles per second (with 3 mm/0.125 in between samples at 100 kph/60 mph for a two sensor per rail configuration, or better for an increased number of sensors).

For a longitudinal travel speed of the system ranging from 70 km/h to about 110 km/h, longitudinal resolutions can range from about 2 mm per profile (between samples) to about 3 mm per profile (between samples) with two sensors. The resolution increases while using three or more sensors. For example, using three synchronized sensors, the longitudinal resolution at a system speed of 100 km/h can reach approximately 1.9 mm between samples or closer to 1 mm between samples at slower speeds. The use of this synchronized and multiplexed sensor methodology allows a track measurement and assessment system to operate faster than competitive systems that employ a single sensor for the same longitudinal sampling resolution.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A system for inspecting railway track infrastructure at high speed and high resolution, the system comprising:
a power source;
a light emitting apparatus powered by the power source for emitting light energy toward a railway track bed;
a data storage apparatus;
a first sensor directed to a first viewing area for sensing reflected light that was emitted from the light emitting apparatus and acquiring three dimensional elevation and intensity data of the railway track bed to be stored in the data storage apparatus;
a second sensor substantially collinear with and adjacent to the first sensor and directed to the first viewing area for sensing reflected light that was emitted from the light emitting apparatus and acquiring three dimensional elevation and intensity data of the railway track bed to be stored in the data storage apparatus;

a high resolution distance measuring encoder for providing longitudinal sample pulse distance data; and at least one processor in communication with the data storage apparatus, the first sensor, the second sensor, and the distance measuring encoder wherein the at least one processor is configured for sequencing the timing of operation for the first sensor and the second sensor in a cascading, repeating manner such that the first sensor is triggered for operation while the second sensor is on standby and wherein the second sensor is triggered for operation while the first sensor is on standby, and wherein multiplexed data gathered by the first sensor and the second sensor are combined and demultiplexed_to generate a higher resolution resultant three dimensional elevation and intensity data of the railway track bed than if only a single sensor were used.

2. The system of claim 1 wherein the longitudinal resolution of the system comprises a resolution ranging from about 0.002 meters between samples to about 0.003 meters between samples when the system travels longitudinally at a speed ranging from about 70 kilometers per hour to about 110 kilometers per hour wherein the first sensor and the second sensor are each configured to take a maximum of from about 4500 samples per second to about 5500 samples per second.

3. A system for inspecting railway track infrastructure at high speed and high resolution, the system comprising:
a power source;
a light emitting apparatus powered by the power source for emitting light energy toward a railway track bed;
a data storage apparatus;
a first sensor directed to a first viewing area for sensing reflected light that was emitted from the light emitting apparatus and acquiring three dimensional image data of the railway track bed to be stored in the data storage apparatus;
a second sensor substantially collinear with and adjacent to the first sensor and directed to the first viewing area for sensing reflected light that was emitted from the light emitting apparatus and acquiring three dimensional elevation and intensity data of the railway track bed to be stored in the data storage apparatus;
an N sensor substantially collinear with and adjacent to the second sensor and directed to the first viewing area, wherein N is a set of one or more ordinal numbers each of which equals a different integer of 3 or greater, for sensing reflected light that was emitted from the light emitting apparatus and acquiring three dimensional image data of the railway track bed to be stored in the data storage apparatus;
a high resolution distance measuring encoder for providing longitudinal sample pulse distance data; and
at least one processor in communication with the data storage apparatus, the first sensor, the second sensor, the N sensor, and the distance measuring encoder wherein the processor is configured for sequencing the timing of operation for the first sensor, the second sensor, and the N sensor in a cascading, repeating manner such that the first sensor is triggered for operation while the second sensor and the N sensor are on standby, wherein the second sensor is triggered for operation while the first sensor and the N sensor are on standby, and wherein the N sensor is triggered for operation while the first sensor and the second sensor are on standby, and wherein multiplexed data gathered by the first sensor, the second sensor and the N sensor are combined and demultiplexed to generate a higher resolution resultant three dimensional elevation and intensity data of the railway track bed than if only two sensors were used.

4. The system of claim 3 wherein N={3, 4}.

5. The system of claim 3 wherein N={3, 4, 5}.

6. A method of inspecting railway track infrastructure at high speed and high resolution, the method comprising the steps of:
a. emitting light from a light source toward a railway track bed;
b. receiving longitudinal sample pulse distance data from a high resolution distance measuring encoder;
c. sequencing the timing for activation of a first sensor and a second sensor directed to the same viewing area in a repeating pattern based on the received longitudinal sample pulse distance data so that the first sensor is activated during time periods when the second sensor is on standby and the first sensor is on standby during time periods when the second sensor is activated, wherein the first sensor is collinear with and adjacent to the second sensor;
d. detecting light reflected from the railway track bed using the first sensor while the first sensor is activated; and
e. detecting light reflected from the railway track bed using the second sensor while the second sensor is activated.

7. The method of claim 6 further comprising the steps of:
f. compiling a data set of first elevation data based on the light detected by the first sensor; and
g. compiling a data set of second elevation data based on the light detected by the second sensor.

8. The method of claim 7 further comprising the steps of:
h. storing the first elevation data on a data storage apparatus; and
i. storing the second elevation data on a data storage apparatus.

9. The method of claim 7 further comprising the step of combining and demultiplexing the first elevation data and the second elevation data to compile a total elevation data set.

10. The method of claim 9 wherein the total elevation data set has a longitudinal resolution ranging from about 0.002 m between samples to about 0.004 m between samples while the first sensor and the second sensor are traveling at a speed ranging from about 70 km per hour to about 110 km per hour.

11. The method of claim 9 further comprising the step of analyzing the total elevation data set to inventory components of the railway track infrastructure and to assess the condition of the railway track infrastructure.

12. The method of claim 6 wherein the sequencing step further comprises the steps of triggering the activation of the first sensor based on an encoder first phase signal and triggering the activation of the second sensor based on an encoder second phase signal.

13. The method of claim 6 further comprising the steps of:
f. sequencing the timing for activation of a third sensor so that the third sensor is activated during a time period when the first sensor and the second sensor are on standby; and
g. detecting light reflected from the railway track bed using the third sensor while the third sensor is activated.

14. The method of claim 7 further comprising the steps of compiling a multiplexed data set of third elevation data based on the light detected by the third sensor and combining and demultiplexing the first elevation data, the second elevation data and the third elevation data to compile a total elevation data set.

15. The method of claim 14 wherein the total elevation data set has a longitudinal resolution ranging from about 0.001 m between samples to about 0.003 m between samples while the first sensor, the second sensor and the third sensor are traveling at a speed ranging from about 70 km per hour to about 110 km per hour.

* * * * *